(12) United States Patent
Nishio et al.

(10) Patent No.: US 11,711,174 B2
(45) Date of Patent: *Jul. 25, 2023

(54) COMMUNICATION APPARATUS AND COMMUNICATION METHOD

(71) Applicant: Sun Patent Trust, New York, NY (US)

(72) Inventors: Akihiko Nishio, Osaka (JP); Seigo Nakao, Osaka (JP)

(73) Assignee: Sun Patent Trust, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/861,029

(22) Filed: Jul. 8, 2022

(65) Prior Publication Data
US 2022/0345254 A1    Oct. 27, 2022

Related U.S. Application Data

(63) Continuation of application No. 17/034,968, filed on Sep. 28, 2020, now Pat. No. 11,418,295, which is a
(Continued)

(30) Foreign Application Priority Data

Jun. 23, 2008 (JP) ................................. 2008-163033

(51) Int. Cl.
*H04L 1/18* (2023.01)
*H04L 1/1829* (2023.01)
(Continued)

(52) U.S. Cl.
CPC ......... *H04L 1/1861* (2013.01); *H04B 7/0426* (2013.01); *H04B 7/0632* (2013.01);
(Continued)

(58) Field of Classification Search
CPC ..... H04L 1/1861; H04L 5/0048; H04L 5/005; H04L 5/0051; H04L 5/0007;
(Continued)

(56) References Cited

U.S. PATENT DOCUMENTS 6,961,364 B1  11/2005 Laroia et al.
7,808,882 B2  10/2010 Imamura
(Continued)

FOREIGN PATENT DOCUMENTS

EP  1148673 A2  10/2001
EP  1898542 A1  3/2008
(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.3.0, May 2008. (77pages).
(Continued)

*Primary Examiner* — Steven H Nguyen
(74) *Attorney, Agent, or Firm* — Seed IP Law Group LLP

(57) ABSTRACT

Disclosed is a wireless communication base station apparatus whereby it is possible to prevent degradation of throughput of LTE terminals, even when LTE terminals and LTE+ terminals are present together. In this apparatus, a setting section (105) sets in each subframe a resource block in which is arranged a reference signal that is employed solely by LTE+ terminals, based on the pattern of arrangement of reference signals employed solely by LTE+ terminals. In the case of symbols that are mapped to antennas (110-1) to (110-4), an arrangement section (106) arranges the characteristic cell reference signals employed by both LTE terminals and LTE+ terminals in all of the resource blocks in a single frame. In contrast, in the case of the symbols that are mapped to the antennas (110-5) to (110-8), the arrangement section (106) arranges in some of the resource blocks, that are set in accordance with the setting results input from a setting section (105), the characteristic cell reference signals that are employed solely by the LTE+ terminals.

18 Claims, 12 Drawing Sheets

Related U.S. Application Data continuation of application No. 16/400,306, filed on May 1, 2019, now Pat. No. 10,826,656, which is a continuation of application No. 15/717,323, filed on Sep. 27, 2017, now Pat. No. 10,333,657, which is a continuation of application No. 14/931,121, filed on Nov. 3, 2015, now Pat. No. 9,806,857, which is a continuation of application No. 12/999,044, filed as application No. PCT/JP2009/002824 on Jun. 22, 2009, now Pat. No. 9,219,532.

(51) Int. Cl.
| | |
|---|---|
| H04J 11/00 | (2006.01) |
| H04L 5/00 | (2006.01) |
| H04W 52/32 | (2009.01) |
| H04W 72/56 | (2023.01) |
| H04B 7/0426 | (2017.01) |
| H04B 7/06 | (2006.01) |

(52) U.S. Cl.
CPC ............ *H04J 11/003* (2013.01); *H04L 5/005* (2013.01); *H04L 5/0048* (2013.01); *H04L 5/0051* (2013.01); *H04W 52/325* (2013.01); *H04W 72/56* (2023.01); *H04L 5/0007* (2013.01)

(58) Field of Classification Search
CPC ... H04B 7/0426; H04B 7/0632; H04J 11/003; H04W 52/325; H04W 72/10
See application file for complete search history.

(56) References Cited

U.S. PATENT DOCUMENTS

| | | | |
|---|---|---|---|
| 7,961,699 B2 | 6/2011 | Morimoto et al. | |
| 7,979,075 B2 | 7/2011 | Cheng et al. | |
| 7,983,236 B2 | 7/2011 | Rinne et al. | |
| 8,654,747 B2 | 2/2014 | Taoka et al. | |
| 9,219,532 B2* | 12/2015 | Nishio | H04W 52/325 |
| 9,806,857 B2* | 10/2017 | Nishio | H04W 72/56 |
| 10,333,657 B2* | 6/2019 | Nishio | H04J 11/003 |
| 10,826,656 B2* | 11/2020 | Nishio | H04B 7/0632 |
| 11,418,295 B2* | 8/2022 | Nishio | H04L 5/0051 |
| 2005/0100038 A1 | 5/2005 | Pietraski et al. | |
| 2005/0135308 A1 | 6/2005 | Vijayan et al. | |
| 2006/0114812 A1 | 6/2006 | Kim et al. | |
| 2006/0203794 A1 | 9/2006 | Sampath et al. | |
| 2006/0274712 A1 | 12/2006 | Malladi et al. | |
| 2007/0070944 A1 | 3/2007 | Rinne et al. | |
| 2007/0081502 A1 | 4/2007 | Lee et al. | |
| 2007/0082692 A1 | 4/2007 | Tirkkonen et al. | |
| 2007/0189240 A1 | 8/2007 | Cho et al. | |
| 2007/0202913 A1 | 8/2007 | Ban | |
| 2007/0293172 A1 | 12/2007 | Shi et al. | |
| 2007/0293233 A1 | 12/2007 | Inoue et al. | |
| 2008/0080467 A1 | 4/2008 | Pajukoski et al. | |
| 2008/0089312 A1 | 4/2008 | Malladi | |
| 2008/0225993 A1* | 9/2008 | Malladi | H04L 5/0051 375/340 |
| 2008/0298502 A1 | 12/2008 | Xu et al. | |
| 2009/0041150 A1 | 2/2009 | Tsai et al. | |
| 2009/0046582 A1 | 2/2009 | Sarkar et al. | |
| 2009/0046800 A1 | 2/2009 | Xu et al. | |
| 2009/0147865 A1 | 6/2009 | Zhang et al. | |
| 2009/0154588 A1 | 6/2009 | Chen et al. | |
| 2009/0203377 A1 | 8/2009 | Kawasaki | |
| 2009/0219838 A1 | 9/2009 | Jia et al. | |
| 2009/0221289 A1 | 9/2009 | Xu et al. | |
| 2009/0232239 A1 | 9/2009 | Ko et al. | |
| 2009/0252077 A1 | 10/2009 | Khandekar et al. | |
| 2009/0268695 A1 | 10/2009 | Zhao et al. | |
| 2009/0296563 A1 | 12/2009 | Kishiyama et al. | |
| 2010/0284326 A1 | 11/2010 | Oh | |
| 2010/0322100 A1 | 12/2010 | Wan et al. | |
| 2011/0085536 A1 | 4/2011 | Taoka et al. | |
| 2012/0188946 A1 | 7/2012 | Ma et al. | |

FOREIGN PATENT DOCUMENTS

| | | |
|---|---|---|
| EP | 2180603 A1 | 4/2010 |
| JP | 2007/300503 A | 11/2007 |
| WO | 2007/012193 A1 | 2/2007 |
| WO | 2007/130011 A1 | 11/2007 |
| WO | 2007/149722 A1 | 12/2007 |
| WO | 2008/024751 A2 | 2/2008 |
| WO | 2008/050428 A1 | 5/2008 |
| WO | 2009/025081 A1 | 2/2009 |
| WO | 2009/139383 A1 | 11/2009 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 8)," 3GPP TS 36.213 V8.2.0, Mar. 2008. (30 pages).

3GPP, "3rd Generation Partnersip Project; Technical Specification Group Radio Access Network; Evolved Universal Terrestrial Radio Access (E-UTRA); Physical Channels and Modulation (Release 8)," 3GPP TS 36.211 V8.2.0, Mar. 2008. (65 pages).

Extended European Search Report, dated Jun. 13, 2014, for European Patent Application No. 09769878.1-1851. (11 pages).

International Search Report, dated Jul. 14, 2009, for International Patent Application No. PCT/JP2009/002824. (4 pages).

Kühling, et al., "12×12 MIMO-OFDM Realtime Implementation for 3GPP LTE+ on a Cell Processor," 2008 14th European Wireless Conference, Prague, Czech Republic, Jun. 22-25, 2008. (6 pages).

Nortel, "Performance Evaluation of Dedicated RS Structure for Beam-Forming Transmission," R1-080767, Agenda Item: 6.1.1, 3GPP TSG-RAN 1 Meeting #52, Sorrento, Italy, Feb. 11-15, 2008. (10 pages).

NTT DoCoMo, "Proposals for LTE-Advanced Technologies," R1-081948, Agenda item: 6.2, 3GPP TSG RAN WG1 Meeting #53, Kansas City, USA, May 5-9, 2008. (29 pages).

Samsung, "Power Scaling and DL RS boosting," R1-081231, Agenda Item: 6.3.2, 3GPP TSG-RAN Working Group 1 #52bis, Shenzhen, China, Mar. 31-Apr. 4, 2008. (9 pages).

Samsung, China Mobile, CATT, ZTE, Huawei, "Reference signal transmission in DwPTS," R1-080041, Agenda item: 6.1.7, 3GPP TSG RAN WG1 Meeting #51bis, Sevilla, Spain, Jan. 14-18, 2008. (3 pages).

Sharp, "Proposal for 2-RS and 4-RS structure application in LTE Downlink," R1-072052, Agenda Item: 7.11.1, 3GPP TSG-RAN WG1 #49, Kobe, Japan, May 7-11, 2007. (11 pages).

TD Tech, "RS Configuration in DwPTS," R1-080781, Agenda item: 6.1.7, 3GPP TSG RAN WG1 Meeting #52, Sorrento, Italy, Feb. 11-15, 2008. (2 pages).

ZTE, "Technical points for LTE-advanced," R1-081773, Agenda Item: 6.2, 3GPP TSG RAN1 53 meeting, Kansas, USA, May 5-9, 2008. (10 pages).

\* cited by examiner

COMMUNICATION APPARATUS AND COMMUNICATION METHOD

TECHNICAL FIELD

The present invention relates to a reference signal allocation method and a radio communication base station apparatus.

BACKGROUND ART

3GPP-LTE adopts OFDMA (Orthogonal Frequency Division Multiple Access) as a down link communication method. With 3GPP-LTE, a radio communication base station apparatus (hereinafter "base station") transmits RSs (reference signals) using predetermined communication resources, and radio communication terminal apparatuses (hereinafter "terminals") perform channel estimation using received reference signals to demodulate data (see Non-Patent literature 1.) In addition, terminals use the reference signals to perform adaptive MCS (modulation and channel coding scheme) control, PMI (precoding matrix indicator) control in MIMO (multiple-input multiple-output) transmission, or received quality measurement for adaptive scheduling. Then, terminals feed obtained PMIs and received quality information (CQI: channel quality indicator) back to a base station.

In addition, when a base station has a plurality of antennas, the base station enables diversity transmission. For example, a base station transmits a plurality of data streams from a plurality of antennas (MIMO transmission) to allow high-speed transmission. In order to receive diversity-transmitted signals as described above with no error, terminals need to know the channel states from a group of antennas used for transmission in a base station, to the terminals. Therefore, RSs need to be transmitted without interfering with each other, from all antennas provided in a base station. To realize this, 3GPP-LTE adopts a method of transmitting RSs from respective antennas in a base station, using timings and carrier frequencies varying in the time domain and the frequency domain.

FIG. 1 shows a configuration of a base station having four antennas (4Tx base station) anticipated with 3GPP-LTE, and FIG. 2 shows an RS transmission method in a 4Tx base station (see Non-Patent Literature 2.) Here, in FIG. 2, the vertical axis (frequency domain) is indicated by a unit of subcarriers and the horizontal axis (time domain) is indicated by a unit of OFDM symbols. In addition, R 0, R 1, R 2 and R 3 indicate RSs transmitted from antennas 0, 1, 2 and 3 (the first, second, third and fourth antennas), respectively. Moreover, in FIG. 2, one block unit enclosed by a heavy-line frame (six subcarriers in the frequency domain and fourteen OFDM symbols in the time domain) is referred to as a resource block (RB.) Although one RB is composed of twelve subcarriers in 3GPP-LTE, the number of subcarriers constituting one RB is six here for ease of explanation. In addition, each unit of one subcarrier with one OFDM symbol constituting one RB is referred to as a resource element (RE.) As seen from FIG. 2, in order to minimize RS transmission overhead, a 4Tx base station reduces transmission frequencies of RSs (R2 and R3) from antenna 2 (third antenna) and antenna 3 (fourth antenna.)

Here, RSs shown in FIG. 2 are common to all terminals in the cell covered by a base station, and referred to as cell-specific reference signals. In addition, a base station may additionally transmit RSs multiplied by a specific weight on a per terminal basis (UE-specific reference signals) for beamforming transmission.

As described above, with 3GPP-LTE, the maximum number of antennas in a base station is four, and terminals supporting 3GPP-LTE perform data demodulation and downlink signal quality measurement, using RSs (R0 to R3 shown in FIG. 2) transmitted from a base station having maximum four antennas (4Tx base station.)

By contrast with this, LTE-advanced, which is improved 3GPP-LTE, is studying a base station having maximum eight antennas (8Tx base station.) Here, LTE-advanced needs to provide a base station complying with 3GPP-LTE in order to allow communication of terminals supporting only base stations (4Tx base stations) in 3GPP-LTE. In other words, LTE-advanced is required to accommodate both terminals supporting only a 4Tx base station (hereinafter "LTE terminals") and terminals supporting also an 8Tx base station (hereinafter "LTE+ terminals" or "LTE-advanced terminals").

CITATION LIST

Non-Patent Literature

[NPL 1] 3GPP TS 36.213 V8.2.0 (ftp://ftp.3gpp.org/specs/2008-03/Rel-8/36_series/36213-820.zip)

[NPL 2] 3GPP TS 36.211 V8.2.0 (ftp://ftp.3gpp.org/specs/2008-03/Rel-8/36_series/36211-820.zip)

SUMMARY OF INVENTION

Technical Problem

With LTE-advanced, a base station needs to transmit RSs for eight antennas in order to allow LTE+ terminals to receive diversity-transmitted signals with no error. For example, as shown in FIG. 3, it may be possible to allocate R0 to R7 corresponding to eight antennas, to all RBs. By this means, LTE+ terminals are able to receive signals with no error. Moreover, terminals can obtain the CQI and PMI for each antenna, on a per subframe basis, so that it is possible to improve throughput by MIMO transmission.

However, LTE terminals only know the positions of allocating RSs (R0 to R3) shown in FIG. 2. That is, LTE terminals do not know the presence of RSs used only in LTE+ terminals, that is, R4 to R7 shown in FIG. 3. Therefore, when RSs (R4 to R7) used only in LTE+ terminals are allocated to REs, LTE terminals recognizes the RSs as data signals and receives them. As described above, when LTE terminals and LTE+ terminals exist together, the LTE terminals may not correctly receive signals. This causes error rate performances and throughput of LTE terminals to deteriorate.

It is therefore an object of the present invention to provide a reference signal allocation method and a radio communication base station apparatus that makes it possible to prevent the throughput of LTE terminals from deteriorating even if LTE terminals and LTE+ terminals exist together.

Solution to Problem

The reference signal allocation method according to the present invention includes: allocating first reference signals to all resource blocks in one frame, the first reference signals being used in first radio communication terminal apparatuses supporting a radio communication base station apparatus having N antennas and also used in second radio communication terminal apparatuses supporting a radio communication base station apparatus having more antennas than the N antennas; and allocating second reference signals used only in the second radio communication terminal apparatuses to part of the resource blocks in the one frame.

The radio communication base station apparatus according to the present invention that transmits first reference signals and second reference signals, the first reference signals being used in first radio communication terminals supporting another radio communication base station apparatus having N antennas and also used in second radio communication terminal apparatuses supporting the radio communication base station apparatus having more antennas than the N antennas, and the second reference signals being used only in the second radio communication terminal apparatuses adopts a configuration to include: a setting section that sets resource blocks to allocate the second reference signals on a per subframe basis, based on allocation patterns of the second reference signals; and an allocation section that allocates the first reference signals to all the resource blocks in one frame and allocates the second reference signals to part of the resource blocks set in the one frame.

Advantageous Effects of Invention

According to the present invention, it is possible to prevent throughput of LTE terminals from deteriorating even if LTE terminals and LTE+ terminals exist together.

DESCRIPTION OF EMBODIMENTS

Now, embodiments of the present invention will be described in detail with reference to the accompanying drawings. In the following descriptions, a base station has eight antennas and transmits transmission data to LTE terminals and LTE+ terminals. In addition, one frame is divided into a plurality of subframes. Moreover, a plurality of subcarriers in one subframe are divided into a plurality of RBs. That is, one RB is composed of part of subcarriers in one subframe.

Embodiment 1

Figure 1:
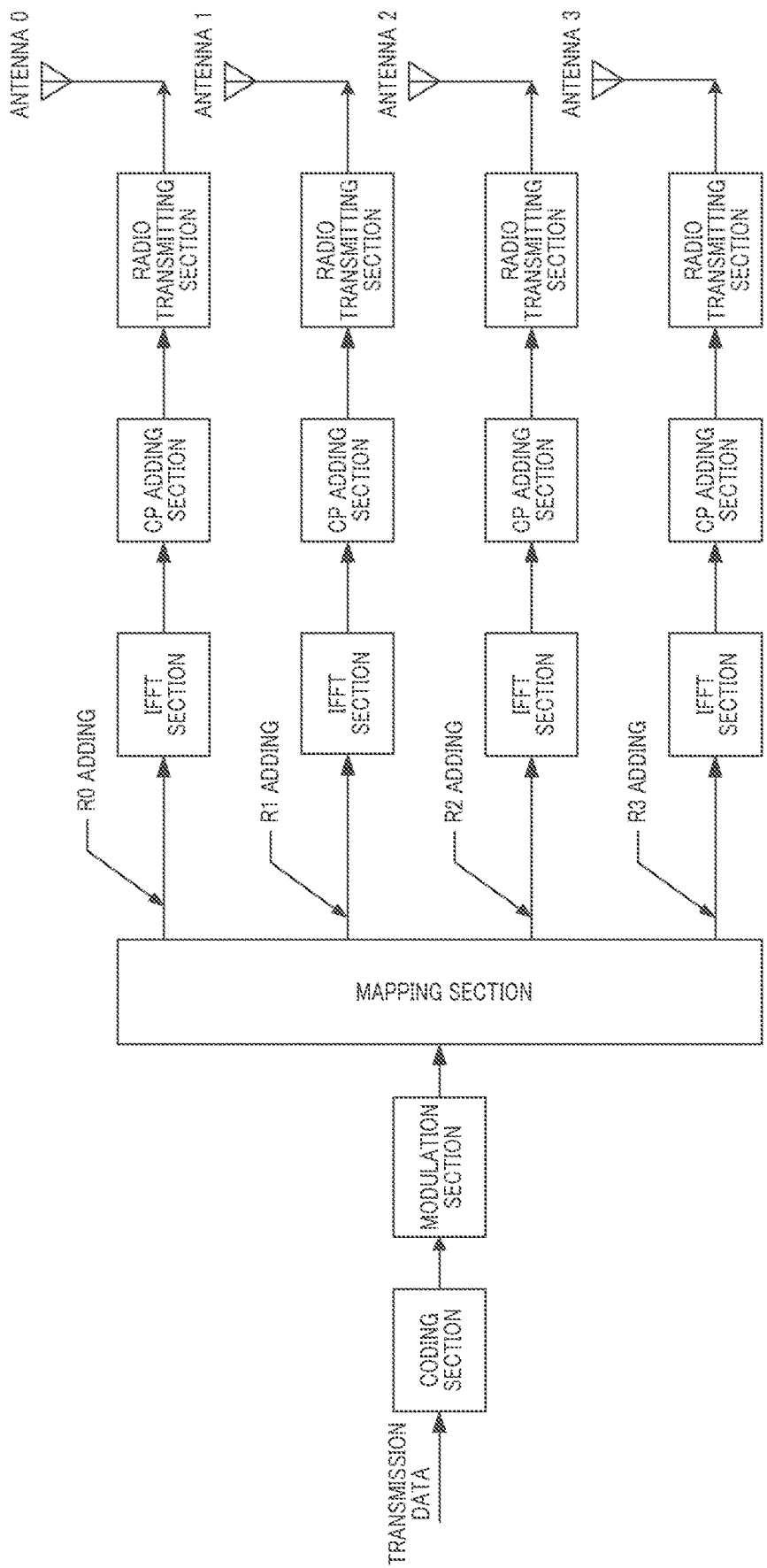
FIG. 1 is a block diagram showing a configuration of a conventional 4Tx base station.
Figure 2:
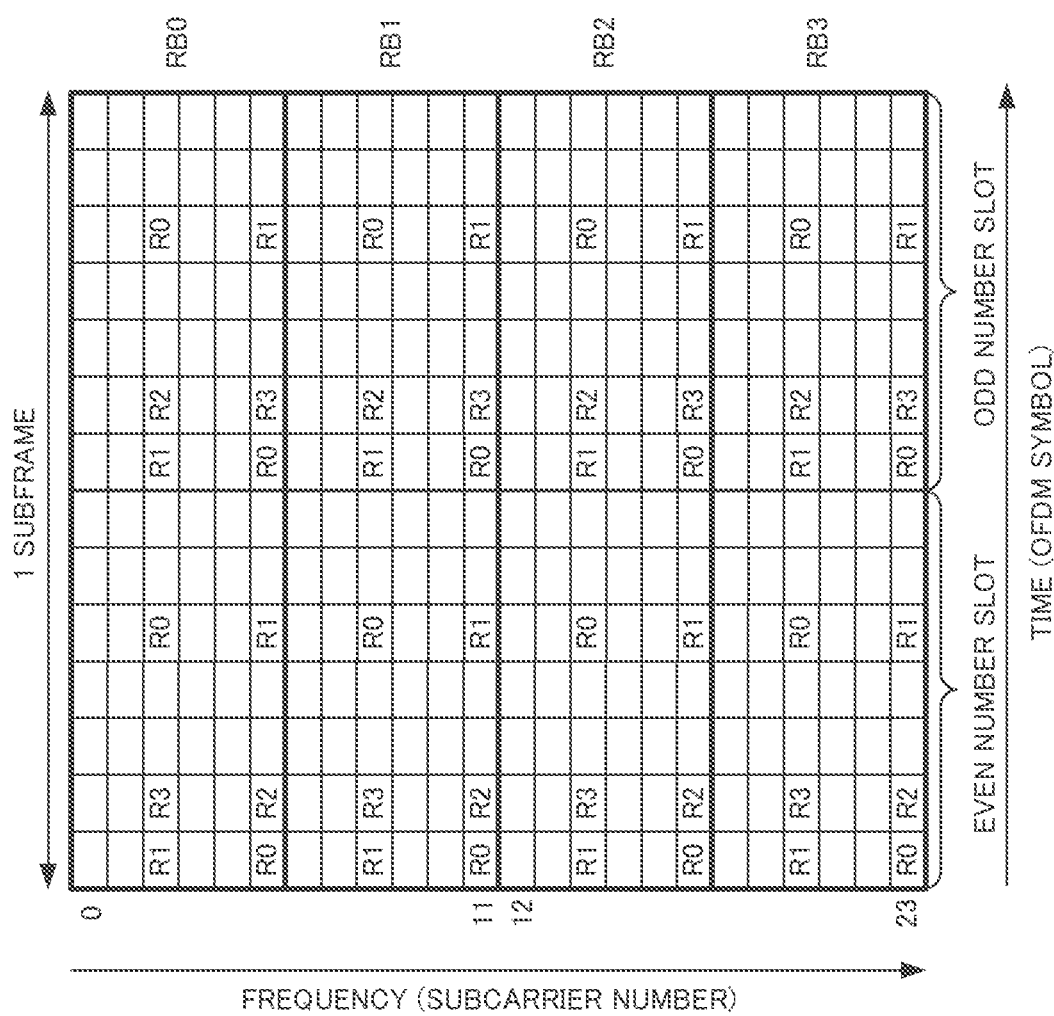
FIG. 2 is a drawing showing an RS transmission method in a conventional 4Tx base station.
Figure 3:
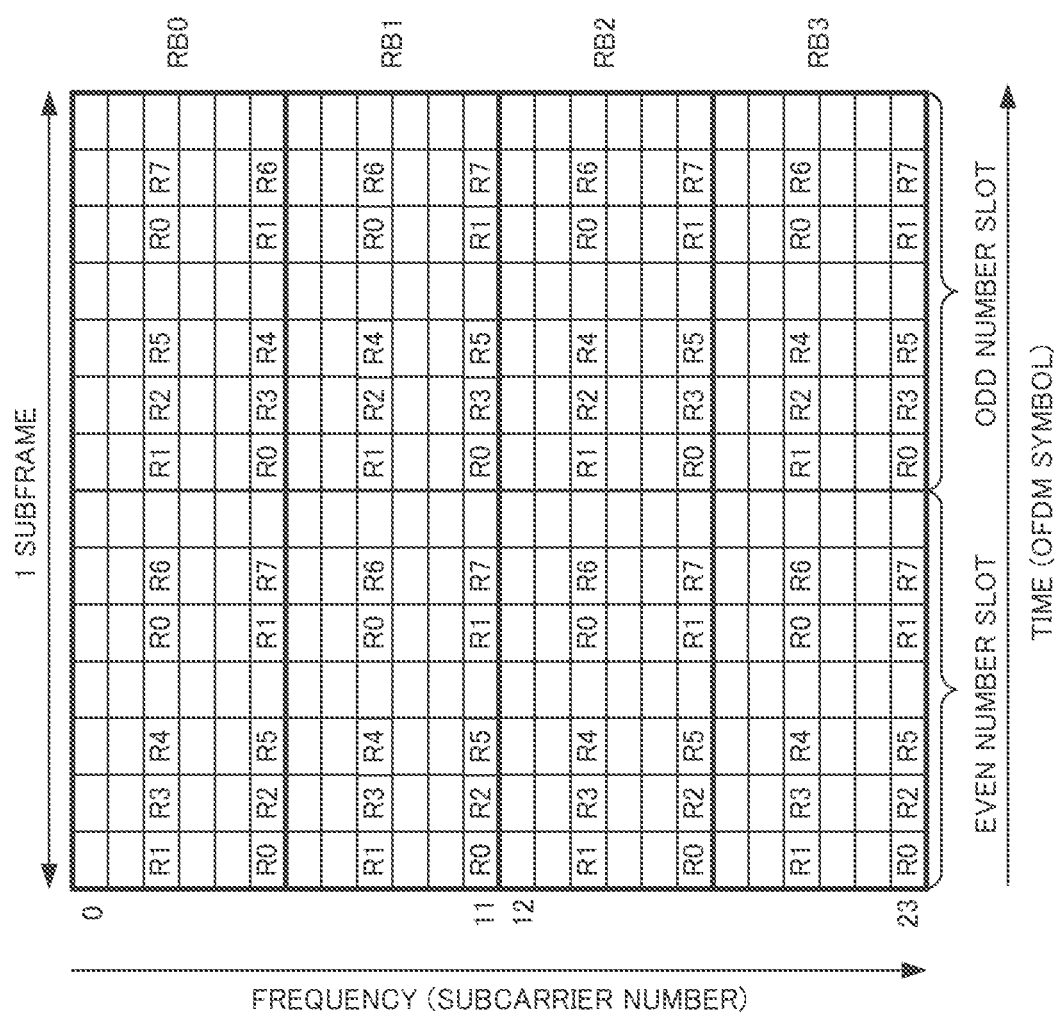
FIG. 3 is a drawing showing an RS transmission method in a conventional 8Tx base station.
Figure 4:
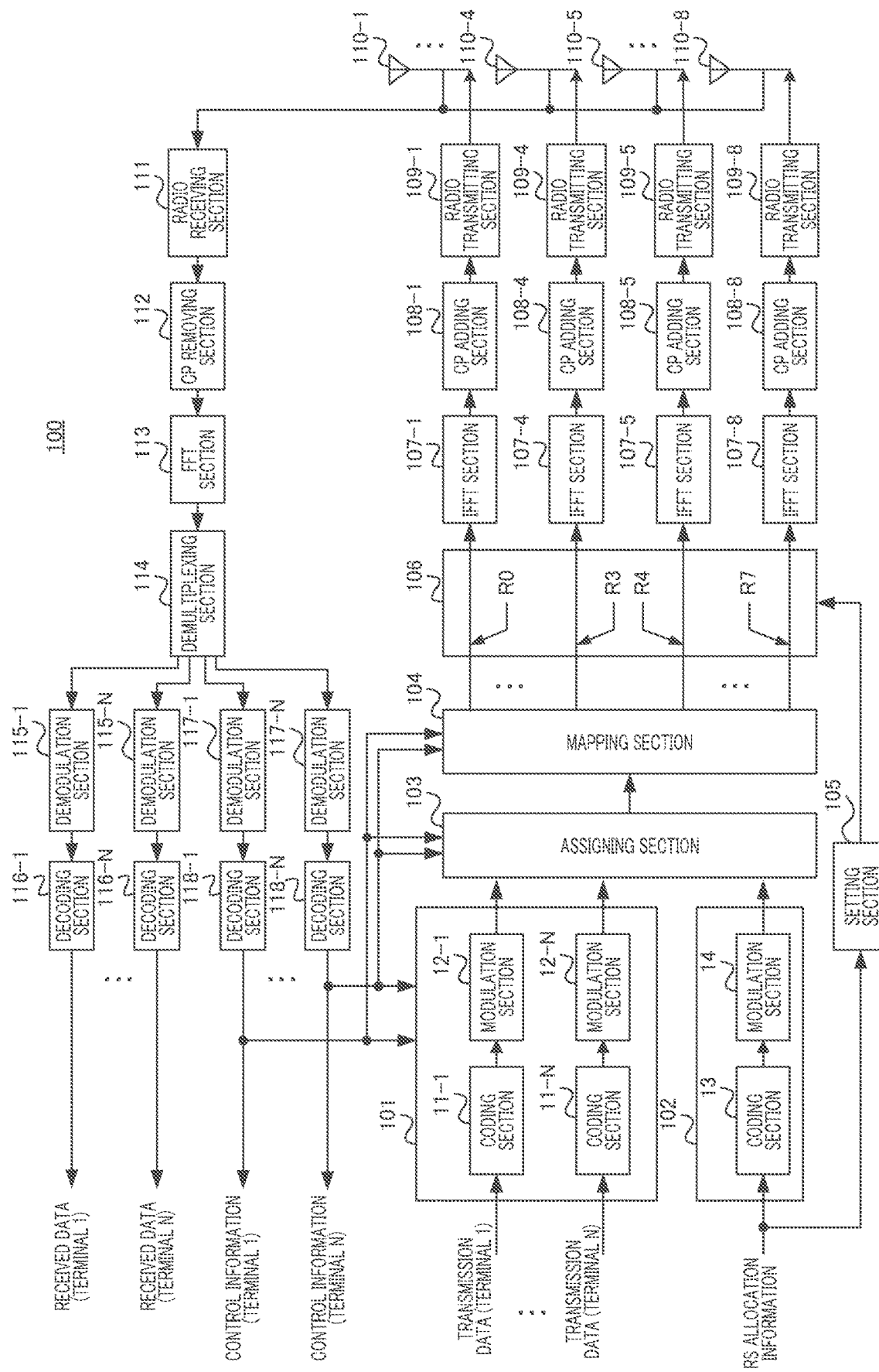
FIG. 4 is a block diagram showing a configuration of a base station according to Embodiment 1 of the present invention.

FIG. 4 shows the configuration of base station 100 according to the present embodiment.

In base station 100, coding and modulation section 101 has N coding sections 11 and N modulation sections 12 for transmission data, and where N is the number of terminals to allow communication with base station 100. In coding and modulation section 101, coding sections 11-1 to 11-N perform coding processing on transmission data to terminals 1-N, and modulation sections 12-1 to 12-N perform modulation processing on encoded transmission data to generate data symbols. Here, coding and modulation section 101 determines a coding rate and modulation scheme (i.e. MCS) in coding section 11 and modulation section 12, respectively, based on CQI information inputted from decoding sections 118-1 to 118-N.

In coding and modulation section 102, coding section 13 performs coding processing on information indicating a cell-specific RS allocation pattern (RS allocation information) used only in LTE+ terminals, and modulation section 14 performs modulation processing on encoded RS allocation information to generate RS allocation information symbols. Here, base station 100 may broadcast RS allocation information to all LTE+ terminals in the cell covered by base station 100, using BCH (broadcast channel) signals.

Assigning section 103 assigns data symbols and RS allocation information symbols to subcarriers constituting an OFDM symbol, according to CQI information inputted from decoding section 118-1 to 118-N, and outputs the result to mapping section 104.

Mapping section 104 maps symbols inputted from assigning section 103 to antennas 110-1 to 110-8, respectively. In addition, mapping section 104 selects a precoding vector used in each antenna, based on PMI information inputted from decoding sections 118-1 to 118-N. Then, mapping section 104 multiplies the symbol mapped to each antenna by the selected precoding vector. Then, mapping section 104 outputs the symbol mapped to each antenna to allocation section 106.

Setting section 105 sets, for each subframe, cell-specific RSs (R4 to R7) transmitted from antennas 110-5 to 110-8, respectively, based on RS allocation information. To be more specific, setting section 105 sets RBs to allocate cell-specific RSs for each of a plurality of subframes, based on an allocation pattern indicating the positions to allocate cell-specific RSs (R4 to R7) used only in LTE+ terminals. Here, in the allocation pattern used in setting section 105, the cell-specific RSs (R0 to R3) used in both LTE terminals and LTE+ terminals are allocated to all RBs in one frame, and the cell-specific RSs (R4 to R7) are allocated to part of RBs in one frame. Then, setting section 105 outputs the setting result to allocation section 106.

Allocation section 106 adds cell-specific RSs (R0 to R7) to symbols inputted from mapped section 104 and mapped to respective antennas. To be more specific, allocation section 106 allocates cell-specific RSs (R0 to R3) used in both LTE terminals and LTE+ terminals, to all RBs in one frame, in symbols mapped to antennas 110-1 to 110-4. On the other hand, allocation section 106 allocates cell-specific RSs (R4 to R7) used only in LTE+ terminals to part of RB having been set, in symbols mapped to antennas 110-5 to 110-8, based on the setting result inputted from setting section 105. In addition, when transmission data directed to LTE+ terminals is assigned to an RB other than the RBs indicated by the setting result inputted from setting section 105, allocation section 106 allocates terminal specific RSs to the RB. For example, allocation section 106 uses R4 to R7 as terminal specific RSs. Here, allocation section 106 may use R4 to R7 multiplied by a terminal specific weight. Then, allocation section 106 outputs symbol sequences after RS allocation to IFFT (inverse fast Fourier transform) sections 107-1 to 107-8.

IFFT sections 107-1 to 107-8, CP (cyclic prefix) adding sections 108-1 to 108-8 and radio transmitting sections 109-1 to 109-8 are provided corresponding to antennas 110-1 to 110-8, respectively.

IFFT sections 107-1 to 107-8 each perform IFFT on a plurality of subcarriers constituting an RB, to which symbols are assigned, to generate an OFDM symbol, which is a multicarrier signal. Then, IFFT sections 107-1 to 107-8 output generated OFDM symbols to CP adding sections 108-1 to 108-8, respectively.

CP adding sections 108-1 to 108-8 each add the same signal as the end part of an OFDM symbol to the beginning of the OFDM symbol as a CP.

Radio transmitting sections 109-1 to 109-8 perform transmission processing, including D/A conversion, amplification, up-conversion and so forth, on OFDM symbols with CPs, and transmit the result to respective terminals via antennas 110-1 to 110-8. That is, base station 100 transmits a plurality of data streams from antennas 110-1 to 110-8.

Meanwhile, radio receiving section 111 receives N signals transmitted from maximum N terminals via antennas 110-1 to 110-8, and performs reception processing, including down-conversion, A/D conversion and so forth, on these signals.

CP removing section 112 removes the CPs from signals after reception processing.

FFT (fast Fourier transform) section 113 performs FFT on signals without CPs to obtain a signal multiplexed in the frequency domain for each terminal. Here, a signal for each terminal includes a data signal and control information containing CQI information and PMI information for each terminal.

Demultiplexing section 114 demultiplexes a signal from each terminal inputted from FFT section 113 into a data signal and control information for each terminal. Then, demultiplexing section 114 outputs data signals from terminals 1 to N, to demodulation sections 115-1 to 115-N, respectively, and outputs control information from terminals 1 to N, to demodulation sections 117-1 to 117-N, respectively.

Base station 100 has demodulation sections 115-1 to 115-N, decoding sections 116-1 to 116-N, demodulation sections 117-1 to 117-N and decoding sections 118-1 to 118-N, where N is the number of terminals that can communicate with base station 100.

Demodulation sections 115-1 to 115-N perform demodulation processing on data signals inputted from demultiplexing section 114, and decoding sections 116-1 to 116-N perform decoding processing on data signals after demodulation. By this means, it is possible to obtain received data per terminal.

Demodulation sections 117-1 to 117-N perform demodulation processing on control information inputted from demultiplexing section 114, and decoding sections 118-1 to 118-N perform decoding processing on control information after demodulation. Then, decoding sections 118-1 to 118-N output CQI information and PMI information of control information to coding and modulation section 101, assigning section 103 and mapping section 104.

Figure 5:
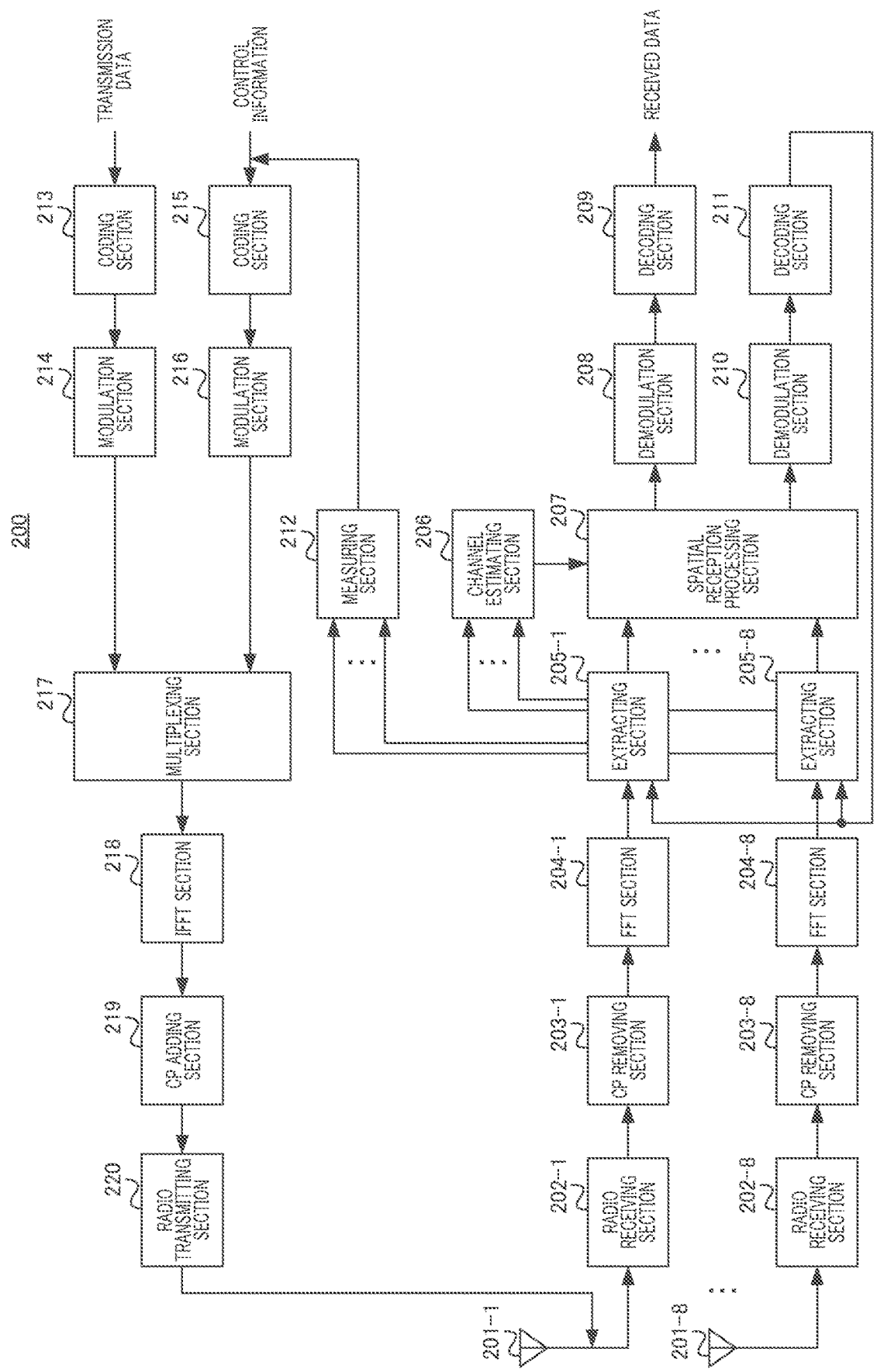
FIG. 5 is a block diagram showing a configuration of an LTE+ terminal according to Embodiment 1 of the present invention.

Next, terminal 200 (LTE+ terminal) according to the present embodiment will be explained. FIG. 5 shows the configuration of terminal 200 according to the present embodiment.

In terminal 200 shown in FIG. 5, radio receiving sections 202-1 to 202-8, CP removing sections 203-1 to 203-8, FFT sections 204-1 to 204-8 and extracting sections 205-1 to 205-8 are provided corresponding to antennas 201-1 to 201-8, respectively.

Radio receiving sections 202-1 to 202-8 receive OFDM symbols transmitted from base station 100 (FIG. 4) via antennas 201-1 to 201-8 and perform reception processing, including down-conversion, A/D conversion and so forth, on these OFDM symbols.

CP removing sections 203-1 to 203-8 remove the CPs from the OFDM symbols after reception processing.

FFT sections 204-1 to 204-8 perform FFT on OFDM symbols without CPs to obtain frequency domain signals.

Extracting sections 205-1 to 205-8 extract cell-specific RSs (R0 to R7) and terminal specific RS (for example, R4 to R7 multiplied with terminal specific weighting) from signals inputted from FFT sections 204-1 to 204-8, based on RS allocation information inputted from decoding section 211. Then, extracting sections 205-1 to 205-8 output cell-specific RSs to channel estimating section 206 and measuring section 212, and outputs terminal specific RSs to channel estimating section 206. In addition, extracting sections 205-1 to 205-8 output signals inputted from FFT sections 204-1 to 204-8 to spatial reception processing section 207. Here, terminal 200 may obtain RS allocation information by receiving BCH signals containing RS allocation information from base station 100.

Channel estimating section 206 performs channel estimation using cell-specific RSs and terminal specific RSs inputted from extracting sections 205-1 to 205-8, and outputs the channel estimation result to spatial reception processing section 207.

Spatial reception processing section 207 performs spatial demultiplexing processing on signals inputted from extracting sections 205-1 to 205-8, respectively, that is, signals received by antennas 201-1 to 201-8, respectively, using the channel estimation result inputted from channel estimating section 206. Then, spatial reception processing section 207 outputs data signals of demultiplexed data streams to demodulation section 208, and outputs RS allocation information of the demultiplexed data streams to demodulation section 210.

Demodulation section 208 performs demodulation processing on data signals inputted from spatial reception processing section 207, and decoding section 209 performs decoding processing on data signals after demodulation. By this means, it is possible to obtain received data.

Demodulation section 210 performs demodulation processing on RS allocation information inputted from spatial reception processing section 207, and decoding section 211 performs decoding processing on RS allocation information after demodulation. Then, decoding section 211 outputs RS allocation information after decoding to extracting sections 205-1 to 205-8.

Meanwhile, measuring section 212 performs CQI measurement for each of antennas 201-1 to 201-8 and PMI estimation to obtain good received quality, using cell-specific RSs (R0 to R7) inputted from extracting sections 205-1 to 205-8. Then, measuring section 212 outputs CQI information indicating the measured CQI and PMI indicating the estimated PMI to coding section 215, as control information.

Coding section 213 performs coding processing on transmission data, and modulation section 214 performs modulation processing on encoded transmission data to generate a data symbol. Then, modulation section 214 outputs the generated data symbol to multiplexing section 217.

Coding section 215 performs coding processing on control information containing CQI information and PMI information inputted from measuring section 212, and modulation section 216 performs modulation processing on encoded control information to generate a control information symbol. Then, modulation section 216 outputs the generated control information symbol to multiplexing section 217.

Multiplexing section 217 multiplexes the data symbol inputted from modulation section 214 and the control information symbol inputted from modulation section 216, and outputs a multiplexed signal to IFFT section 218.

IFFT section 218 performs IFFT on a plurality of subcarriers to which the signal inputted from multiplexing section is assigned and outputs a signal after IFFT to CP adding section 219.

CP adding section 219 adds the same signal as the end part of the signal inputted from IFFT section 218 to the beginning of the signal as a CP.

Radio transmitting section 220 performs transmission processing, including D/A conversion, amplification, up-conversion and so forth, on the signal with a CP, and transmits the result from antenna 201-1 to base station 100 (FIG. 4.)

Next, a cell-specific RS allocation method according to the present embodiment will be described.

Figure 6:
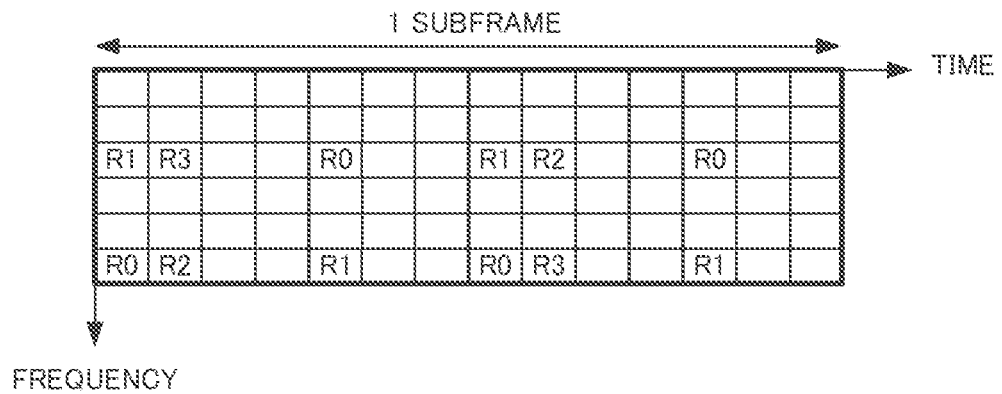
FIG. 6 is a drawing showing an RB in which only RSs used in both LTE terminals and LTE+ terminals according to Embodiment 1 of the present invention.
Figure 7:
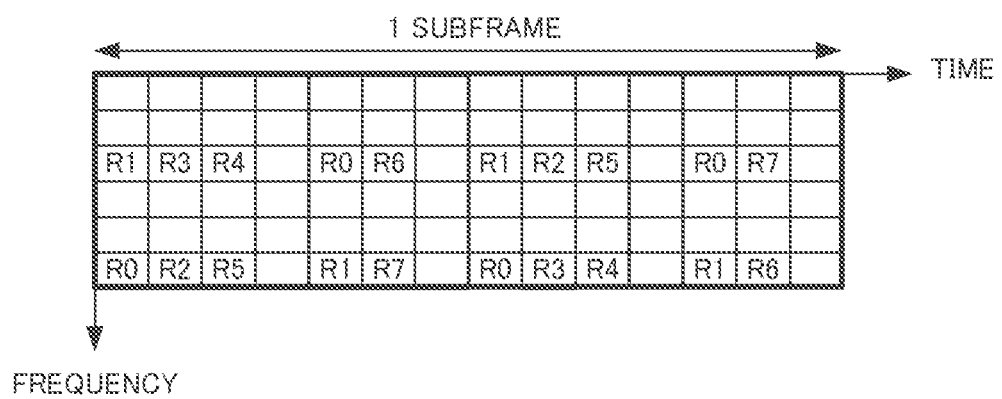
FIG. 7 is a drawing showing an RB in which RSs used only in LTE+ terminals according to Embodiment 1 of the present invention.
Figure 8:
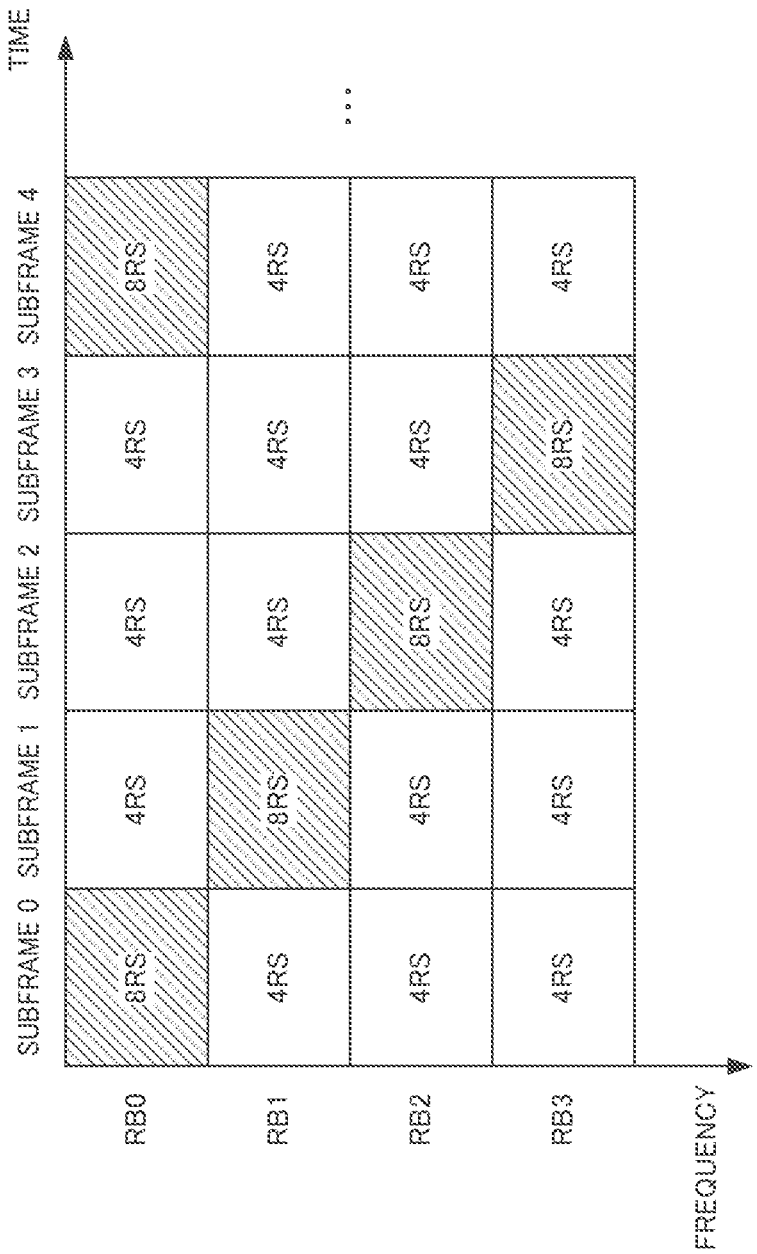
FIG. 8 is a drawing showing an RS allocation pattern according to Embodiment 1 of the present invention (allocation method 1)

In the following descriptions, as shown in FIG. 8, for example, one frame is composed of five subframes (subframes 0 to 4.) In addition, a case will be explained as an example where a plurality of subcarriers in one subframe are evenly divided into four RBs (RB 0 to RB 3). In addition, as shown in FIG. 6 and FIG. 7, one RB is composed of six subcarriers×one subframe. In addition, cell-specific RS (R0 to R3) used in both LTE terminals and LTE+ terminals are allocated to preset REs in an RB as shown in FIG. 6 and FIG. 7. In addition, cell-specific RSs (R4 to R7) used only in LTE+ terminals are allocated to preset REs in an RB as shown in FIG. 7.

In addition, in the following descriptions, an RB (FIG. 6) to allocate four RSs, R 0 to R 3, is represented as 4RS and an RB (FIG. 7) to allocate eight RSs, R 0 to R 7, is represented as 8RS, as shown in FIG. 8. That is, in FIG. 8, while cell-specific RSs (R0 to R3) used in both LTE terminals and LTE+ terminals are allocated to all RBs in one frame, RSs (R4 to R7) used only in LTE+ terminals are allocated to only the RBs represented as 8RSs.

<Allocation Method 1 (FIG. 8)>

This allocation method allocates cell-specific RSs used only in LTE+ terminals, to only part of RBs in one frame.

Here, if cell-specific RSs used only in LTE+ terminals are fixedly allocated to only limited part of frequency bands in one frame, base station 100 can only assign data signals from both LTE+ terminals and LTE terminals to only limited frequency bands. For example, if cell-specific RSs (R4 to R7) used only in LTE+ terminals are fixedly allocated to RB 0 and RB 1 among RB 0 to RB 3 in subframes 0 to 4 of one frame, base station 100 can only allocate data signals directed to LTE terminals to only RB 2 and RB 3. That is, if cell-specific RSs used only in LTE+ terminals are fixedly allocated to only limited part of frequency bands in one frame, RBs to which LTE terminals can be assigned are limited, so that frequency scheduling effect deteriorates.

Therefore, with this allocation method, cell-specific RSs (R4 to R7) used only in LTE+ terminals are allocated to RBs in different frequency bands between neighboring subframes.

To be more specific, as shown in FIG. 8, R4 to R7 are allocated to RB 0 in subframe 0, R4 to R7 are allocated to RB 1 in subframe 1, R4 to R7 are allocated to RB 2 in subframe 2, R4 to R7 are allocated to RB 3 in subframe 3 and R4 to R7 are allocated to RB 0 in subframe 4.

That is, setting section 105 (FIG. 4) in base station 100 sets RB 0 for subframe 0 and sets RB 1 for subframe 1, as RBs to allocate cell-specific RSs (R4 to R7) used only in LTE+ terminals as shown in FIG. 8. The same applies to subframes 2 to 4.

Allocation section 106 allocates R4 to R7 to respective corresponding REs of RB 0 in subframe 0, and allocates R4 to R7 to respective corresponding REs of RB 1 in subframe 1 as shown in FIG. 7. The same applies to subframes 2 to 4.

As shown in FIG. 8, R4 to R7 are allocated to only five RBs, among twenty RBs ("five subframes from RB 0 to RB 4"×"four RBs from RB 0 to RB 3".) That is, only R0 to R3 that can be received by LTE terminals are transmitted using fifteen RBs (4RSs shown in FIG. 8) other than part of RBs (8RSs shown in FIG. 8) to allocate R4 to R7. Therefore, base station 100 is able to assign LTE terminals to RBs (4RSs shown in FIG. 8) other than part of RBs (8RSs shown in FIG. 8) to allocate R4 to R7. By this means, LTE terminals do not receive REs to which R4 to R7 have been allocated, as data symbols by mistake, so that it is possible to prevent deterioration of error rate performances.

In addition, as shown in FIG. 8, RBs (8RSs shown in FIG. 8) to allocate R4 to R7 are allocated to RBs in different frequency bands between neighboring subframes. To be more specific, as shown in FIG. 8, while R4 to R7 are allocated to RB 0 in subframe 0, they are allocated to RB 1 in subframe 1 next to subframe 0, where RB 1 is different from RB 0 in the frequency band. Likewise, R4 to R7 are allocated to RB 2 in subframe 2 next to subframe 1 in different frequency bands from RB 1. The same applies to subframes 3 and 4. That is, R4 to R7 are allocated to RBs shifted one RB per subframe in the frequency domain.

By this means, terminal 200 (LTE+ terminal) can perform CQI measurement and PMI estimation using eight cell-specific RSs (R0 to R7) in any one RB in one subframe, and update CQI and PMIs for all RBs 0 to 3. Then, terminal 200 (LTE+ terminal) feeds the obtained CQI and PMIs back to base station 100. In addition, base station 100 performs adaptive MCS control based on the fed back CQI, and performs MIMO transmission of transmission data using the fed back PMIs. Here, terminal 200 (LTE+ terminal) may feed the CQI and PMI obtained from each subframe back to the base station on a per subframe basis. This allows terminal 200 (LTE+ terminal) to reduce the amount of feedback per subframe and feed newer CQI and PMI, that is, more accurate CQI and PMI per RB back to the base station. In addition, terminal 200 (LTE+ terminal) may obtain all CQI and PMIs of RB 0 to RB 3 and then feed them back to the base station at the same time.

Here, it is anticipated that high-speed transmission using eight antennas in base station 100 (MIMO transmission) is performed in a microcell with a small cell radius. Therefore, high-speed transmission using eight antennas in base station 100 supports only LTE+ terminals moving at low speeds. Therefore, as shown in FIG. 8, even if a long time interval corresponding to four subframes is required to perform CQI measurement and PMI estimation in all RBs, deterioration of the accuracy of CQI measurement and PMI estimation is low because channel quality variation over four subframes is moderate. That is, base station 100 is able to perform adaptive MCS control and MIMO transmission using sufficiently accurate CQI and PMIs from terminal 200 (LTE+ terminal), and therefore improve throughput.

In addition, when data of terminal 200 (LTE+ terminal) is assigned to RBs (4RSs shown in FIG. 8) not to allocate R4 to R7, base station 100 allocates terminal specific RSs for data demodulation (R4 to R7 multiplied by a terminal specific weight), to RBs to which data is assigned, and transmits them. That is, by using terminal specific RSs, base station 100 is able to assign data signals directed to LTE+ terminals not only to RBs (8RSs shown in FIG. 8) to allocate R4 to R7 but also to any of RBs 0 to 3. This allows base station 100 to throw off the limitation of schedulers for LTE+ terminal assignment, so that it is possible to improve frequency scheduling effect.

Here, RBs used to transmit terminal specific RSs vary depending on the decision made by base station 100 that which RBs are assigned to LTE+ terminals, and each LTE+ terminal is reported only the RB assigned to that LTE+ terminal from base station 100, and therefore only know the presence of the terminal specific RSs transmitted to the RB assigned to LTE+ terminal. That is, other LTE+ terminals cannot perform CQI measurement and PMI estimation using terminal specific RSs. However, with this allocation method, a cell-specific RS is transmitted to any one of RBs on a per subframe basis, so that it is possible to perform CQI measurement and PMI estimation even if other LTE+ terminals do not know terminal specific RSs.

As described above, according to this allocation method, cell-specific RSs used only in LTE-terminals are allocated to only part of RBs of a plurality of RBs in one frame. By this means, a base station can assign data signals directed to LTE terminals to RBs other than RBs to allocate cell-specific RSs used only in LTE+ terminals. Therefore, LTE terminals do not receive cell-specific RSs used only in LTE-terminals as data signals by mistake, so that it is possible to prevent deterioration of error rate performances. Therefore, with this allocation method, it is possible to prevent throughput of LTE terminals from deteriorating even if LTE terminals and LTE+ terminals exist together. In addition, when data signals directed to LTE+ terminals are assigned to RBs not to allocate cell-specific RSs used only in LTE+ terminals, a base station allocates terminal specific RSs to RBs. By this means, a base station can assign data signals directed to LTE+ terminals to all RBs, so that it is possible to improve frequency scheduling effect.

In addition, with this allocation method, cell-specific RSs used only in LTE+ terminals are allocated to RBs in different frequency bands between neighboring subframes, and where these RBs are shifted one RB per subframe. By this means, LTE+ terminals can reliably receive cell-specific RSs over a plurality of consecutive subframes even in RBs to which their data signals are not assigned. Therefore, LTE+ terminals are able to accurately perform CQI measurement and PMI estimation in all frequency bands.

Figure 9:
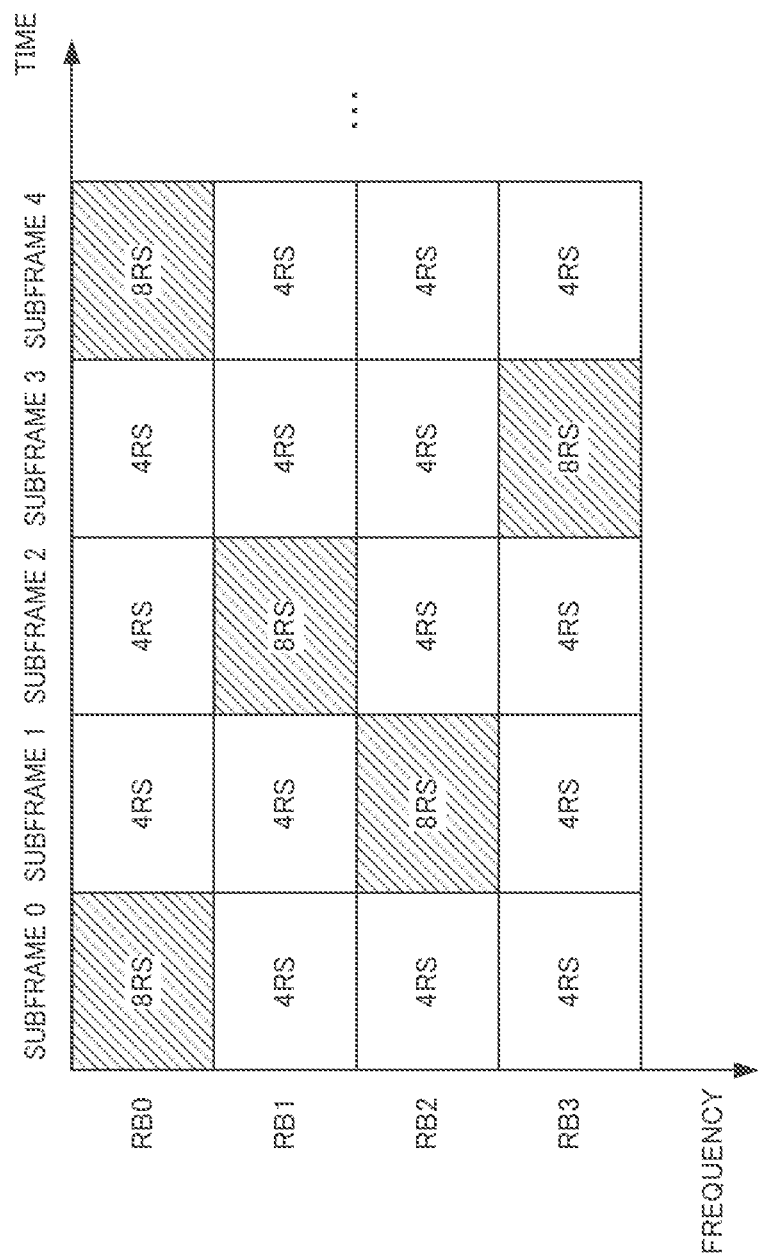
FIG. 9 is a drawing showing an RS allocation pattern according to Embodiment 1 of the present invention (allocation method 1)
Figure 10:
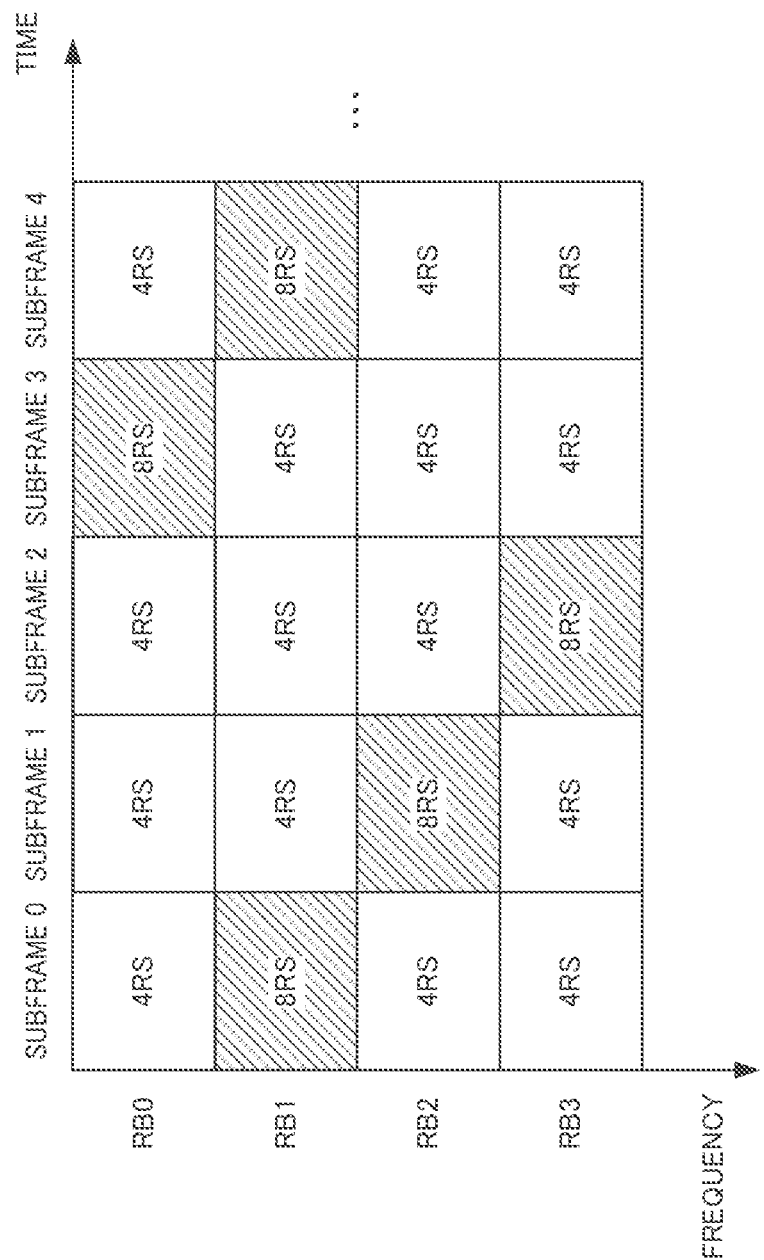
FIG. 10 is a drawing showing an RS allocation pattern according to Embodiment 1 of the present invention (allocation method 1)

Here, with this allocation method, it may be possible to use RS allocation patterns that vary in the time domain and frequency domain per cell. For example, one of two neighboring base stations may use the allocation pattern shown in FIG. 8, while the other base station may use the allocation pattern shown in FIG. 9. R4 to R7 are allocated to RBs 0, 1, 2, 3 and 0 in the order of subframes 0, 1, 2, 3 and 4 in the allocation pattern shown in FIG. 8, while R4 to R7 are allocated to RBs 0, 2, 1, 3 and 0 in the order of subframes 0, 1, 2, 3 and 4 in the allocation pattern shown in FIG. 9. That is, in the allocation pattern shown in FIG. 9, R4 to R7 are allocated to part of RBs in one frame, where the RBs are shifted in the frequency domain every plurality of RBs (two RBs, here) on a per subframe basis. Otherwise, one of two neighboring base stations may use the allocation pattern shown in FIG. 8, while the other base station may use the allocation pattern shown in FIG. 10. In the allocation pattern shown in FIG. 10, R4 to R7 are allocated to RBs 1, 2, 3, 0 and 1 in the order of subframes 0, 1, 2, 3 and 4. That is, R4 to R7 are allocated to RBs shifted one RB at a time from RB 0 in subframe 0 in the allocation pattern shown in FIG. 8, while R4 to R7 are allocated to RBs shifted one RB at a time from RB 1 in subframe 0 in the allocation pattern shown in FIG. 10. By this means, it is possible to reduce the possibility that R4 to R7 are allocated in the same frequency band and the same time domain in a plurality of cells. Generally, cell-specific RSs are transmitted directed to all terminals in a cell, and therefore transmitted using a higher transmission power than data symbols. That is, a terminal located in the cell boundary receives not only cell-specific RSs from the cell to which the terminal belongs, but also cell-specific RSs from neighboring cells, so that inter-cell interference with cell-specific RSs is increased. However, as described above, it is possible to reduce inter-cell interference with cell-specific RSs by using allocation patterns varying in the time domain and the frequency domain on a per cell basis, so that the accuracy of CQI measurement and PMI estimation in each terminal is improved.

In addition, according to the present invention, a configuration is possible where one frame is composed of four subframes, and one frame corresponds to one cycle of an allocation pattern in which R4 to R7 are allocated to all RBs. In this case, an LTE+ terminal moving from a neighboring cell by handover and so forth is able to receive cell-specific RSs (R4 to R7) even if it does not know frame numbers.

<Allocation Method 2 (FIG. 11)>

While cell-specific RSs used only in LTE+ terminals are allocated to one RB in one subframe with allocation method 1, cell-specific RSs used in LTE+ terminals are allocated to a plurality of RBs in one subframe with this allocation method.

When a terminal moves at a low speed, channel quality variation between a base station and the terminals is moderate. On the other hand, when a terminal moves at a high speed, channel quality variation between a base station and the terminal is significant. That is, when a terminal moves at a higher speed, the channel quality variation per subframe is significant. Accordingly, in a case in which a terminal moves at a higher speed, if RSs obtained in a subframe early for a long time interval is used, it is not possible to correctly reflect the channel quality at this time, so that accuracy of CQI measurement and PMI estimation deteriorates.

Therefore, with this allocation method, cell-specific RSs used only in LTE+ terminals (R4 to R7) are allocated to a plurality of RBs in one subframe.

Figure 11:
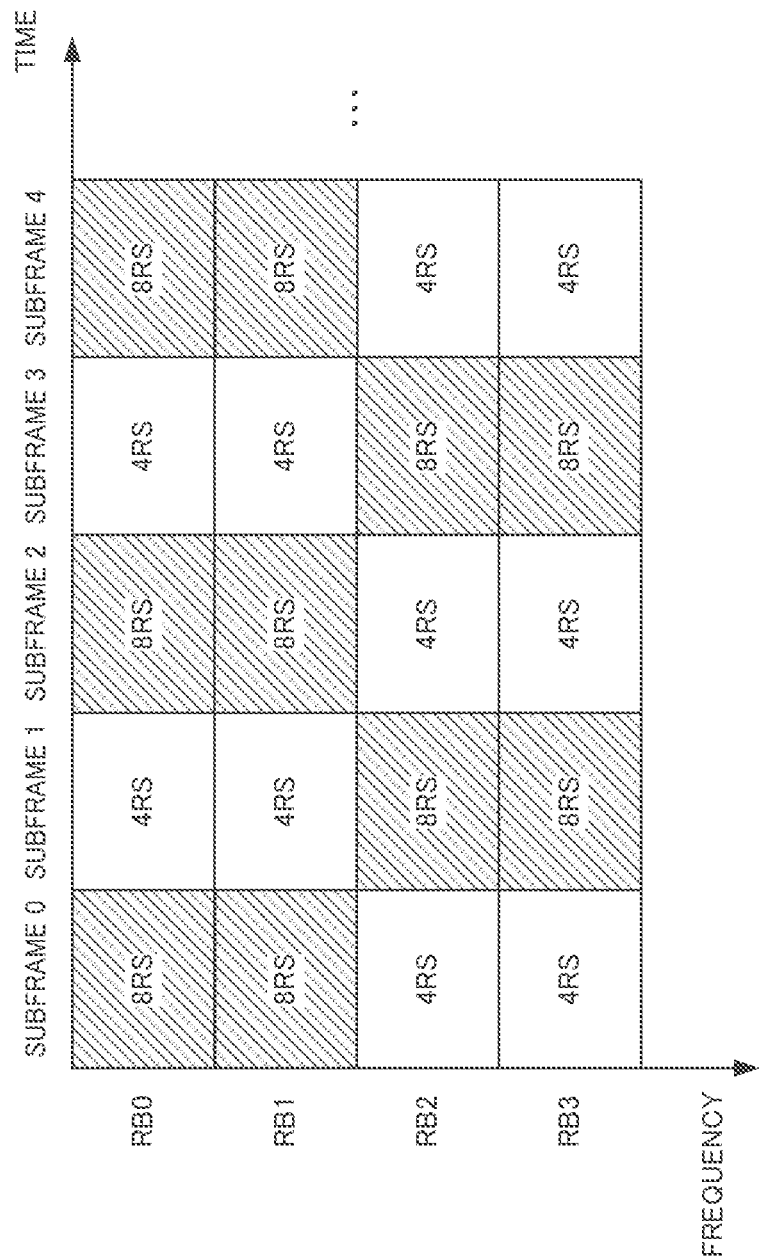
FIG. 11 is a drawing showing an RS allocation pattern according to Embodiment 1 of the present invention (allocation method 2)

To be more specific, as shown in FIG. 11, R4 to R7 are allocated to RB 0 and RB 1 in subframe 0, R4 to R7 are allocated to RB 2 and RB 3 in subframe 1, R4 to R7 are allocated to RB 0 and RB 1 in subframe 2, R4 to R7 are allocated to RB 2 and RB 3 in subframe 3 and R4 to R7 are allocated to RB 0 and RB 1 in subframe 4.

That is, setting section 105 (FIG. 4) in base station 100 sets two RBs, RB 0 and RB 1, in subframe 0 and sets two RBs, RB 2 and RB 3, in subframe 1, as RBs to allocate cell-specific RSs (R4 to R7) used only in LTE+ terminals as shown in FIG. 11. The same applies to subframes 2 to 4.

In addition, allocation section 106 allocates R4 to R7 to respective corresponding REs of RB 0 and RB 1 in subframe 0, and allocates R4 to R7 to respective corresponding REs of RB 2 and RB 3 in subframe 1 as shown in FIG. 7. The same applies to subframes 2 to 4.

As shown in FIG. 11, R4 to R7 are allocated to ten RBs, among twenty RBs in one frame. That is, only R0 to R3, which can be received by LTE terminals, are transmitted in ten RBs (4RSs shown in FIG. 11) other than part of RBs (8RSs shown in FIG. 11) to allocate R4 to R7. This allows LTE terminals to prevent deterioration of error rate performances in the same way as in allocation method 1 (FIG. 8.)

In addition, while terminal 200 (LTE+ terminal) in allocation method 1 (FIG. 8) can receive cell-specific RSs (R0 to R7) allocated to all RBs using four subframes, terminal 200 (LTE+ terminal) in FIG. 11 can receive cell-specific RSs (R0 to R7) allocated to all RBs using two subframes. In other words, while terminal 200 (LTE+ terminal) in allocation method 1 (FIG. 8) can receive R4 to R7 in one RB every four subframes, terminal 200 (LTE+ terminal) in FIG. 11 can receive R4 to R7 in one RB every two subframes. That is, terminal 200 (LTE+ terminal) in this allocation method can receive new R4 to R7 at narrower subframe intervals than in allocation method 1. By this means, with this allocation method, it is possible to update channel quality in all RBs at narrower subframe intervals than in allocation method 1. Therefore, even if terminal 200 (LTE+ terminal) moves at a high speed, it is possible to use channel quality measured using cell-specific RSs in a subframe received at an earlier time, so that terminal 200 can improve the accuracy of CQI measurement and PMI estimation.

Figure 12:
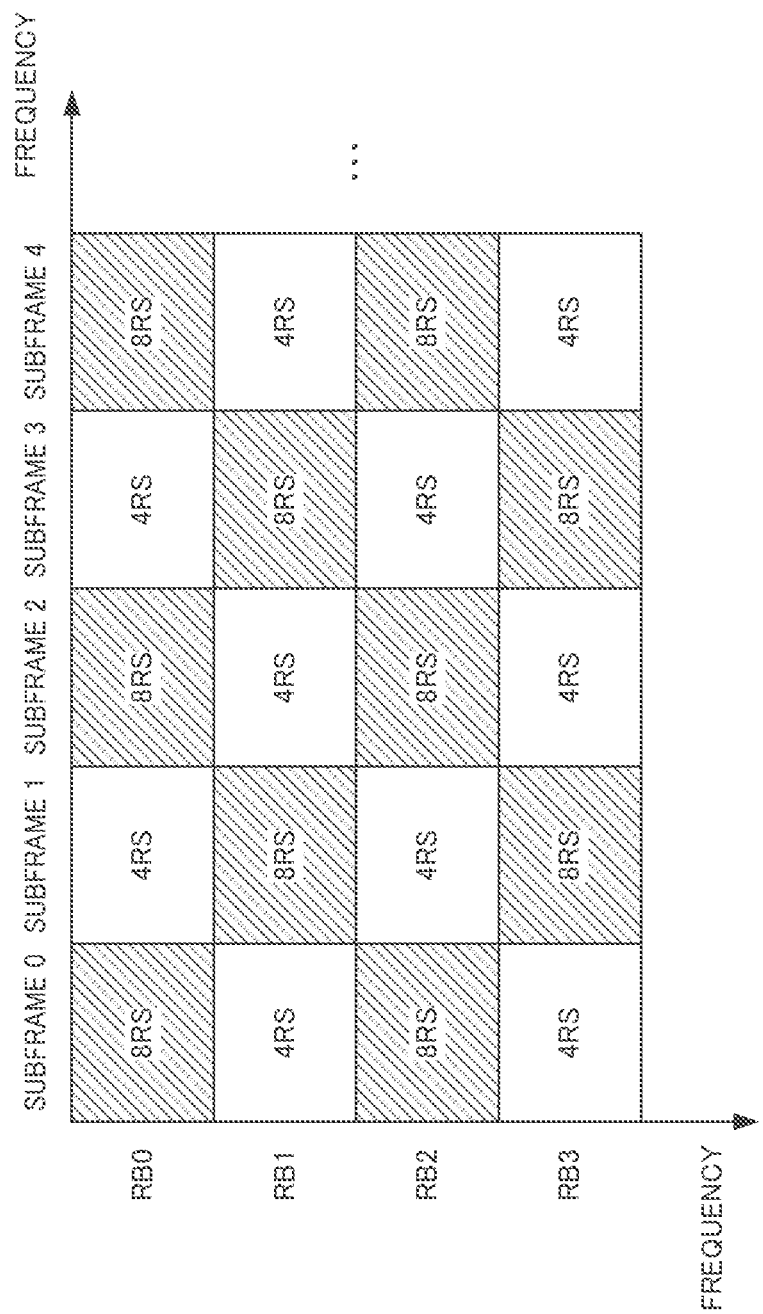
FIG. 12 is a drawing showing an RS allocation pattern according to Embodiment 1 of the present invention (allocation method 2)

Here, this allocation method may use an allocation pattern shown in FIG. 12 instead of the allocation pattern shown in FIG. 11. That is, cell-specific RSs (R4 to R7) used only in LTE+ terminals may be allocated to a plurality of discrete RBs in the frequency domain in one subframe.

To be more specific, as shown in FIG. 12, R4 to R7 are allocated to RB 0, and RB 2, which does not continue to RB 0 in the frequency domain, in subframe 0, and R4 to R7 are allocated to RB 1, and RB 3, which is discontinued to RB 1 in the frequency domain, in subframe 1. The same applies to subframes 2 to 4.

As described above, by allocating cell-specific RSs used only in LTE+ terminals to a plurality of discrete RBs in the frequency domain in one subframe, RBs (4RSs shown in FIG. 12) to which data signals directed to LTE terminals can be assigned, are also discontinued in the frequency domain in base station 100. Therefore, even if frequency selectivity is moderate, base station 100 is able to assign RBs distributed in the frequency domain, to LTE terminals. By this means, it is possible to prevent base station 100 from continuously assigning LTE terminals to RBs with poor received quality, so that it is possible to improve frequency schedule effect.

Here, with this allocation method, the number of RBs to which LTE terminals can be assigned is less than in allocation method 1 (FIG. 8.) However, RBs to which LTE terminals can be allocated vary on a per subframe basis, so that base station 100 is able to assign LTE terminals to RBs with better channel quality in one of two consecutive subframes. That is, deterioration of frequency scheduling effect due to decrease in the number of RBs to which LTE terminals can be allocated is low.

As described above, according to this allocation method, cell-specific RSs used only in LTE+ terminals are allocated to part of a plurality of RBs in one subframe. By this means, it is possible to produce the same effect as in allocation method 1. In addition, according to this allocation method, even if there is an LTE+ terminal moving at a high speed, the LTE+ terminal can perform CQI measurement and PMI estimation using RSs received in a newer subframe, that is, RSs reflecting the channel quality at this time.

Here, with this allocation method, base station 100 may switch between the allocation pattern shown in FIG. 11 and the allocation pattern shown in FIG. 12, depending on channel states (frequency selectivity) in a cell. That is, setting section 105 in base station 100 may switch the frequency interval of a plurality of RBs to allocate R4 to R7 in one subframe, depending on channel states in a cell. By this means, base station 100 allows scheduling suitable for channel states, and therefore makes it possible to increasingly improve frequency scheduling effect.

<Allocation Method 3 (FIG. 13)>

With this allocation method, cell-specific RSs used only in LTE+ terminals are allocated to part of RBs at predetermined subframe intervals.

As described above, if a terminal moves at a low speed, channel quality variation between a base station and the terminal is moderate. Therefore, in a case in which a terminal moves at a low speed, even if channel quality provided by using RSs obtained in a subframe early for a long time interval, is used as the channel quality at this time, the accuracy of CQI measurement and PMI estimation does not deteriorate. Therefore, when a terminal moves at a low speed, cell-specific RSs used only in LTE+ terminals need not to be allocated to RBs on a per subframe basis, unlike in allocation method 1 (FIG. 8.)

Therefore, with this allocation method, cell-specific RSs (R4 to R7) used only in LTE+ terminals are allocated to part of RBs at predetermined subframe intervals.

In the following descriptions, the predetermined subframe interval is two subframes. In addition, like in allocation method 2 (FIG. 12), cell-specific RSs used only in LTE+ terminals (R4 to R7) are allocated to a plurality of discrete RBs in the frequency domain in one sub frame.

Figure 13:
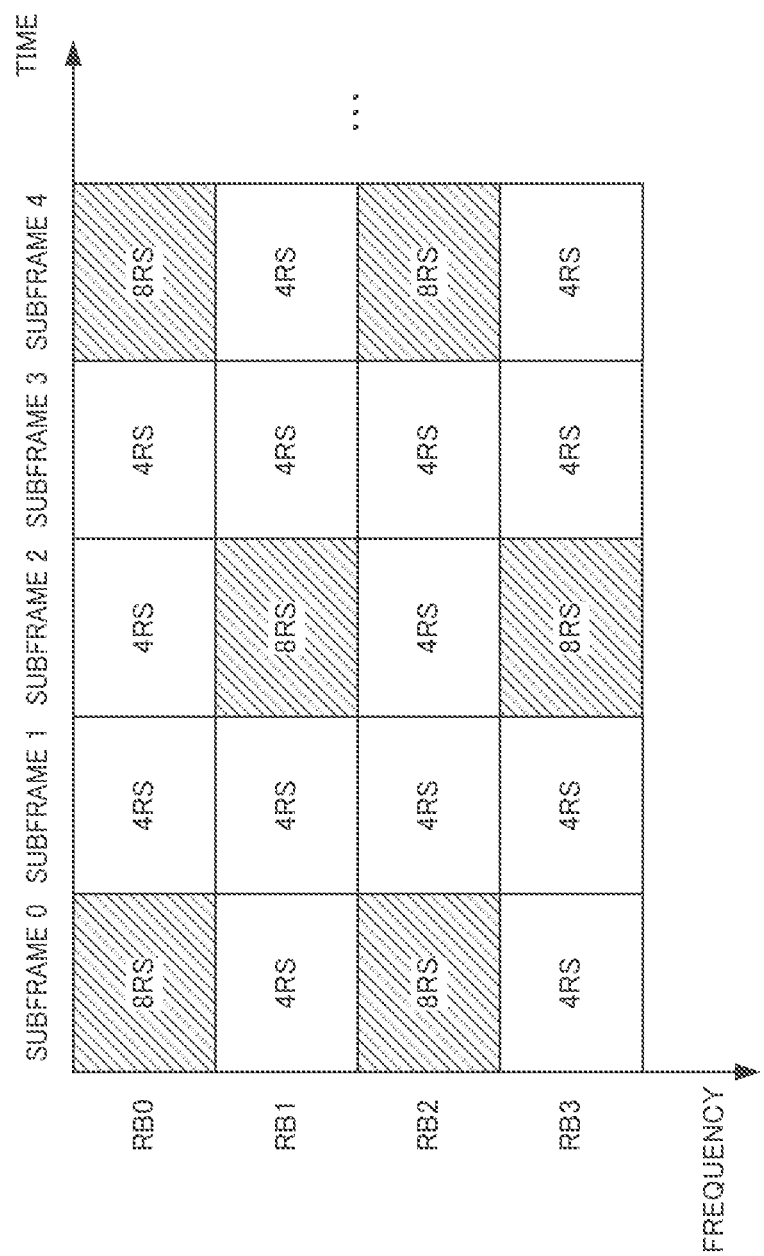
FIG. 13 is a drawing showing an RS allocation pattern according to Embodiment 1 of the present invention (allocation method 3.)

To be more specific, as shown in FIG. 13, R4 to R7 are allocated to RB 0 and RB 2 in subframe 0, R4 to R7 are allocated to RB 1 and RB 3 in subframe 2 two subframes apart from subframe 0, and R4 to R7 are allocated to RB 0 and RB 2 in subframe 4 two subframes apart from subframe 2.

That is, as shown in FIG. 13, setting section 105 (FIG. 4) in base station 100 sets two RBs, RB 0 and RB 2, in subframe 0, sets two RBs, RB 1 and RB 3, in subframe 2, and sets two RBs, RB 0 and RB 2, in subframe 4, as RBs to allocate cell-specific RSs (R4 to R7) used only in LTE+ terminals. Meanwhile, setting section 105 sets no RB to allocate R4 to R7 in subframe 1 and subframe 3.

In addition, allocation section 106 allocates R4 to R7 to respective corresponding REs of RB 0 and RB 2 in subframe 0, allocates R4 to R7 to respective corresponding REs of RB 1 and RB 3 in subframe 2, and allocates R4 to R7 to respective corresponding REs of RB 0 and RB 2 in subframe 4, as shown in FIG. 7.

As shown in FIG. 13, R4 to R7 are allocated to only six RBs of twenty RBs in one frame. That is, only R0 to R3 that can be received by LTE terminals are transmitted in fourteen RBs (4RSs shown in FIG. 13) other than part of RBs (8RSs shown in FIG. 13) to allocate R4 to R7. Therefore, LTE terminals are able to prevent deterioration of error rate performances in the same way as in allocation method 1 (FIG. 8.)

In addition, terminal 200 (LTE+ terminal) can receive cell-specific RSs (R0 to R7) allocated to all RBs using four subframes in FIG. 13. Accordingly, terminal 200 (LTE+ terminal) can update CQI and PMI for each RB every four subframes in the same way as in allocation method 1 (FIG. 8.)

As described above, according to this allocation method, cell-specific RSs used only in LTE+ terminals are allocated to part of RBs at predetermined subframe intervals. By this means, it is possible to reduce the number of cell-specific RSs used only in LTE+ terminals in one frame while the accuracy of CQI measurement and PMI estimation in LTE+ terminals is maintained, and also possible to increase the number of RBs to assign data signals directed to LTE terminals. Therefore, according to this allocation method, even if LTE terminals and LTE+ terminals exist together, it is possible to maximally reserve RBs assigned to LTE terminals, so that it is possible to prevent throughput of LTE terminals from deteriorating in the same way as in allocation method 1.

Here with this allocation method, although the predetermined subframe interval is limited to two subframes, the predetermined subframe interval is not limited to two subframes. For example, base station 100 may set predetermined subframe intervals according to the moving speed of an LTE+ terminal. To be more specific, when an LTE+ terminal moves at a lower speed, base station 100 may set predetermined subframe intervals greater because channel quality variation is moderate.

Allocation methods 1 to 3 according to the present embodiment have been explained.

As described above, according to the present embodiment, even if LTE terminals and LTE+ terminals exist together, it is possible to prevent the throughput of LTE terminals from deteriorating. In addition, according to the present embodiment, a base station throws off the limitation of scheduling RBs to assign LTE+ terminals, and the number of RBs to assign LTE terminal increases, so that it is possible to perform frequency scheduling on more frequency bands.

Embodiment 2

With the present embodiment, a case will be explained where allocation methods 1 to 3 according to Embodiment 1 are selectively employed depending on cell environments.

As described above, while allocation method 1 makes it possible to reduce the number of RBs to allocate cell-specific RSs (R4 to R7) used only in LTE+ terminals as compared to allocation method 2, allocation method 2 allows a base station to transmit cell-specific RSs (R4 to R7) allocated to all RBs in narrower subframe intervals than in allocation method 1. That is, while allocation method 1 makes it possible to reserve a greater number of RBs to allocate LTE terminals in one frame than in allocation method 2, allocation method 2 allows the subframe interval to be narrower where LTE+ terminals can update channel quality in the entire frequency domain than in allocation method 1.

Likewise, while allocation method 3 makes it possible to reserve a greater number of RBs to allocate LTE terminals in one frame than in allocation method 2, allocation method 2 allows the subframe interval to be narrower where LTE+ terminals can update channel quality in the entire frequency domain than in allocation method 3.

That is, the relationship between the number of RBs to which LTE terminals can be assigned in one frame and subframe intervals in which LTE+ terminals can update channel quality in all RBs is trade-off between allocation method 1 (allocation method 3) and allocation method 2.

Therefore, setting section 105 (FIG. 4) according to the present embodiment sets RBs to allocate cell-specific RSs (R4 to R7) by switching between allocation method 1 (allocation method 3) and allocation method 2 according to Embodiment 1, depending on cell environments.

Now, switching methods 1 and 2 in setting section 105 according to the present embodiment will be explained.

<Switching Method 1>

With this switching method, the allocation method is changed according to the number of LTE terminals in a cell.

As described above, base station 100 (FIG. 4) is able to assign LTE+ terminals to RBs other than the RBs to allocate cell-specific RSs (R4 to R7) by allocating R4 to R7, which are terminal specific RSs. By contrast with this, base station 100 can only assign LTE terminals to only RBs other than the RBs to allocate cell-specific RSs (R4 to R7.) Therefore, when the number of LTE terminals is greater, base station 100 needs to reserve more RBs to which LTE terminals can be assigned, that is, RBs other than the RBs to allocate cell-specific RSs used only in LTE+ terminals. To be more specific, when the number of LTE terminals is greater, base station 100 needs to reduce the number of RBs to allocate cell-specific RSs used only in LTE+ terminals.

On the other hand, when the number of LTE terminals is smaller, base station 100 can reserve more RBs to allocate cell-specific RSs used only in LTE+ terminals. This allows terminal 200 (FIG. 5) to receive cell-specific RSs used only in LTE+ terminals in more RBs, frequency scheduling effect in LTE+ terminals is improved.

Therefore, when the number of LTE terminals is great, setting section 105 sets RBs to allocate R4 to R7 using allocation method 1 (allocation method 3), and, when the number of LTE terminals is small, sets RBs to allocate R4 to R7 using allocation method 2. To be more specific, setting section 105 switches between allocation methods by comparing the number of LTE terminals with a preset threshold. That is, when the number of LTE terminals is equal to or higher than the threshold, setting section 105 switches the allocation method to allocation method 1 (allocation method 3), and, when the number of LTE terminals is lower than the threshold, switches the allocation method to allocation method 2. That is, setting section 105 changes the number of cell-specific RSs used only in LTE+ terminals, depending on the number of LTE terminals in a cell.

By this means, when the number of LTE terminals is great, base station 100 employs allocation method 1 (allocation method 3), and therefore is able to maximally reserve RBs to which LTE terminals can be assigned, while allocating cell-specific RSs used only in LTE+ terminals to part of RBs. On the other hand, when the number of LTE terminals is small, base station 100 employs allocation method 2, and therefore is able to maximally reserve RBs to allocate cell-specific RSs used only in LTE+ terminals, while reserving RBs to which LTE terminals can be assigned.

As described above, according to this switching method, when the number of LTE terminals in a cell is great, a base station switches the allocation method to an allocation method to allow preferential acquisition of RBs to which LTE terminals can be assigned. On the other hand, when the number of LTE terminals in a cell is small, a base station switches the allocation method to an allocation method to allow preferential acquisition of frequency scheduling effect by narrowing subframe intervals in which LTE+ terminals can receive cell-specific RSs in all frequency bands. By this means, whether the number of LTE terminals is great or small, it is possible to produce frequency scheduling effect while reserving RBs to assign LTE terminals.

<Switching Method 2>

With this switching method, allocation methods are switched depending on the moving speed of an LTE+ terminal in a cell.

As described above, when an LTE+ terminal moves at a higher speed, channel quality variation is significant, so that terminal 200 needs to update channel quality for each RB at narrower time intervals, that is, at narrower subframe intervals, in order to perform CQI measurement and PMI estimation without deterioration of accuracy.

On the other hand, an LTE+ terminal moves at a lower speed, channel quality variation is moderate, so that terminal 200 can perform CQI measurement and PMI estimation without deterioration of the accuracy even if the channel quality of each RB is updated at wide time intervals, that is, at wide subframe intervals.

Therefore, when an LTE+ terminal moves at a low speed, setting section 105 sets RBs to allocate R4 to R7 using allocation method 1 (allocation method 3), and, when an LTE+ terminal moves at a high speed, sets RBs to allocate R4 to R7 using allocation method 2. To be more specific, setting section 105 switches allocation methods by comparing the moving speed of an LTE+ terminal with a preset threshold. That is, when there are only LTE+ terminals moving at moving speeds equal to or lower than the threshold, setting section 105 switches the allocation method to allocation method 1 (allocation method 3), and, when there are LTE+ terminals moving at moving speeds higher than the threshold, switches the allocation method to allocation method 2. That is, setting section 105 changes intervals of subframes to allocate sell specific RSs used only in LTE+ terminals, depending on the moving speed of a LTE terminal.

By this means, when LTE+ terminals move at low speeds, base station 100 employs allocation method 1 (allocation method 3), and therefore is able to maximally reserve RBs to which LTE-terminals can be assigned while minimizing RBs to allocate cell-specific RSs used only in LTE+ terminals. On the other hand, when LTE+ terminals move at high speeds, base station 100 employs allocation method 2, and therefore is able to maximally reserve RBs to allocate cell-specific RSs used only in LTE+ terminals while reserving RBs to which LTE terminals can be assigned.

As described above, according to this switching method, when LTE+ terminals move at low speeds in a cell, base station switches the allocation method to an allocation method to allow preferential acquisition of RBs to which LTE terminals can be assigned. On the other hand, when LTE+ terminals move at high speeds in a cell, a base station switches the allocation method to an allocation method to allow preferential acquisition of frequency scheduling effect by narrowing subframe intervals in which LTE+ terminals can receive cell-specific RSs in all frequency bands. By this means, whether LTE+ terminals in a cell move at high or low speeds, it is possible to produce frequency diversity effect in LTE+ terminals while reserving RBs to assign LTE terminals in the same way as in switching method 1.

Switching methods 1 and 2 in setting section 105 according to the present embodiment have been explained.

As described above, according to the present embodiment, methods of allocating cell-specific RSs used only in LTE-terminals are switched depending on cell environments, so that it is possible to maximally produce frequency scheduling effect in LTE+ terminals while maximally reserving RBs to which LTE terminals can be assigned, depending on cell environments.

Here, with the present embodiment, after switching between the allocation pattern of allocation method 1 (allocation method 3) and the allocation pattern of allocation method 2, base station 100 (FIG. 4) may broadcast information indicating that the allocation pattern has been switched, to all terminals 200 (LTE+ terminals) using BCH signals. Here, allocation patterns 1 to 3 are shared between base station 100 and terminals 200. By this means, base station 100 can switch between allocation patterns depending on cell environments without reporting an allocation pattern to terminal 200 every time the allocation pattern is switched. In addition, base station 100 may individually report information indicating that the allocation pattern has been switched to LTE+ terminals, using RRC (radio resource control) signaling.

The embodiments according to the present invention have been described.

Here, according to the present invention, the transmission power of cell-specific RSs (R4 to R7) used only in LTE+ terminals, among cell-specific RSs (R0 to R7), may be lower than the transmission power of cell-specific RSs (R0 to R3) used in both LTE terminals and LTE+ terminals. It is anticipated that terminals (LTE terminals and LTE+ terminals) to receive signals transmitted from a base station using four antennas are located all over a cell. By contrast with this, it is anticipated that terminals to receive signals transmitted at a high speed from a base station using six antennas are located near the center of a cell where channel quality is good. Therefore, a base station can improve efficiency of RS transmission by transmitting cell-specific RSs (R4 to R7) used only in LTE+ terminals, at lower power than the power to transmit cell-specific RSs (R0 to R3) used in both LTE terminals and LTE+ terminals. Moreover, according to the present embodiment, the number of RS symbols per RB (i.e. RS allocation density) of cell-specific RSs (R4 to R7) used only in LTE+ terminals, among cell-specific RSs (R0 to R7), may be lower than the allocation density of cell-specific RSs (R0 to R3) used in both LTE terminals and LTE+ terminals.

In addition, with the above-described embodiments, a communication system in which LTE terminals and LTE+ terminals exist together, has been explained. However, the present invention is not limited to a communication system in which LTE terminals and LTE+ terminals exist together, and is applicable to, for example, a communication system in which terminals supporting only a base station having N antennas and terminals supporting a base station having more than N antennas exist together. In addition, the present invention is applicable to a case in which terminal 1 and terminal 2 exist together, and where terminal 1 operates in communication system A and terminal 2 operates in only communication system B of an earlier version than communication system A in which terminal 1 operates.

Moreover, with the above-described embodiments, a case has been explained where the number of subframes constituting one frame is five, and a plurality of subcarriers in one subframe is divided into four RBs. However, according to the present invention, the number of subframes constituting one frame is not limited to five, and also the number of RBs into which a plurality of subcarriers in one subframe is divided, is not limited to four.

A terminal may also be referred to as "UE," a base station apparatus may also be referred to as a "Node B" and a subcarrier may also be referred to as a "tone." Moreover, a CP may also be referred to as a "guard interval (GI.)" Furthermore, a cell-specific RS may also be referred to as "common RS." Furthermore, a reference signal may also be referred to as "pilot signal." Furthermore, a subframe may also be referred to as "slot."

Furthermore, an antenna may also be referred to as "antenna port." Here, a plurality of physical antennas may be used as one antenna port. "Antenna port" refers to a theoretical antenna formed by one or more physical antennas. That is, "antenna port" does not necessarily refer to one physical antenna, but may refer to an array antenna and so forth composed of a plurality of antennas. For example, 3GPP-LTE does not define how many physical antennas constitute an antenna port but defines an antenna port as a minimum unit to allow a base station to transmit different reference signals. In addition, an antenna port may be defined as a minimum unit for multiplying a precoding vector as weighting. For example, in a base station having eight physical antennas (physical antennas 0 to 7), physical antennas 0 and 4 transmit R0 with weighting (e.g. weighting factor (1, 1)) and transmit R4 with weighting orthogonal to the weighting of R0 (e.g. weighting factor (1, −1)). Likewise, physical antennas 1 and 5 transmit R1 with weighting (e.g. weighting factor (1, 1)) and transmit R5 with weighting orthogonal to the weighting of R1 (e.g. weighting factor (1, −1)). In addition, physical antennas 2 and 6 transmit R2 with weighting (e.g. weighting factor (1, 1)) and transmit R6 with weighting orthogonal to the weighting of R2 (e.g. weighting factor (1, −1)). Moreover, physical antennas 3 and 7 transmit R3 with weighting (e.g. weighting factor (1, 1)) and transmit R7 with weighting orthogonal to the weighting of R3 (e.g. weighting factor (1, −1)). By this means, LTE+ terminals can perform channel estimation by demultiplexing respective channels from physical antennas 0 and 4 to these LTE+ terminals using R0 and R4. Likewise, LTE+ terminals can perform channel estimation by demultiplexing respective channels from physical antennas 1 and 5 to these LTE+ terminals using R1 and R5, perform channel estimation by demultiplexing respective channels from physical antennas 2 and 6 to these LTE+ terminals using R2 and R6 and perform channel estimation by demultiplexing respective channels from physical antennas 3 and 7 to these LTE+ terminals using R3 and R7. That is, a base station transmits two cell-specific RSs with weighting orthogonal to one another, from two physical antennas. Even if this RS transmission method is employed, the present invention can provide the same advantage as in the above-described embodiments.

In addition, with the above-described embodiments, although the cases have been described where LTE+ terminals employs high-order MIMO (MIMO with eight antennas), the present invention is not limited to this but is applicable to a case in which the receiving side (LTE+ terminals) receives reference signals for more antennas than in 3GPP-LTE, for example, receives reference signals from a plurality of base stations. For example, although one base station has eight antennas in the above-described embodiment, the present invention is applicable to a case in which a plurality of base stations have eight antennas. In addition, with the above-described embodiments, assume that 3GPP-LTE uses four antennas, a case has been described as an example where high-order MIMO uses eight antennas by adding four antennas with respect to the case of 3GPP-LTE. However, the present invention is not limited to this, and assume that 3GPP-LTE uses two antennas, high-order MIMO may use a total of four antennas by adding two antennas with respect to the case of 3GPP-LTE. Otherwise, the above-described numbers of antennas may be combined, and assume that 3GPP-LTE uses two antennas or four antennas, high-order MIMO may use the number of antennas by adding two antennas or four antennas with respect to the case of 3GPP-LTE. Otherwise, assume that 3GPP-LTE uses two antennas, high-order MIMO may use a total of eight antennas by adding six antennas with respect to the case of 3GPP-LTE.

In addition, when the concept of antenna port is employed, even if the number of actual physical antennas is eight, four antenna ports may be defined for cell-specific RSs supporting 3GPP-LTE (cell-specific RSs used in both LTE terminals and LTE+ terminals) and other eight antenna ports may be defined for cell-specific RSs supporting high-order MIMO (cell-specific RSs used only in LTE+ terminals). In this case, a base station can operate such that it transmits cell-specific RSs supporting 3GPP-LTE with weighting by two physical antennas per antenna port and transmits cell-specific RSs supporting high-order MIMO without weighting, from each antenna.

In addition, cell-specific RSs may be defined as RSs used to demodulate broadcast information (PBCH) or PDCCH in its cell, and terminal specific RSs may be defined as RSs used to demodulate transmission data to terminals.

In addition, methods of transforming between the frequency domain and the time domain are not limited to IFFT and FFT.

Moreover, the present invention is applicable to not only base stations and terminals, but also all radio communication apparatuses.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-163033, filed on Jun. 23, 2008, including the specification, drawings and abstract, is incorporated herein by reference in its entirety.

INDUSTRIAL APPLICABILITY

The present invention is applicable to a mobile communication system and so forth.

The invention claimed is:

1. A communication apparatus comprising:
   circuitry, which, in operation, maps a first type reference signal used in a first type of communication and a second type of communication in all subframes including a first subframe, a second subframe and a third subframe, and maps a second type reference signal used in the second type of communication mapped in the first subframe and the third subframe, the second type reference signal being not mapped in the second subframe between the first subframe and the third subframe, and the second type reference signal being mapped such that a number of resources to which the second type reference signal is mapped per resource block is lower than a number of resources to which the first type reference signal is mapped per resource block; and
   a transmitter, which, in operation, transmits the first type reference signal and the second type reference signal.

2. The communication apparatus according to claim 1, wherein the circuitry, in operation, maps a third type reference signal on a resource block upon which data is mapped.

3. The communication apparatus according to claim 2, wherein the third type reference signal is a UE-specific reference signal.

4. The communication apparatus according to claim 1, wherein the first type reference signal and the second type reference signal are a cell-specific reference signal.

5. The communication apparatus according to claim 1, wherein at least one of the first type reference signal and the second type reference signal is used for computing a CQI.

6. The communication apparatus according to claim 1, wherein the type first reference signal is used for demodulating the PBCH or a downlink control channel.

7. The communication apparatus according to claim 1, wherein the first type reference signal is a reference signal configured for up to 4 antenna ports, and the second type reference signal is a reference signal configured for up to 8 antenna ports.

8. The communication apparatus according to claim 1, wherein the first type of communication supports up to 4 antenna ports for the first type reference signal, and the second type of communication supports up to 8 antenna ports for the second type reference signal.

9. The communication apparatus according to claim 1, wherein the first type of communication is a communication in LTE, and the second type of communication is a communication in LTE-Advanced.

10. A communication method comprising:
    mapping a first type reference signal used in a first type of communication and a second type of communication in all subframes including a first subframe, a second subframe and a third subframe;
    mapping a second type reference signal used in the second type of communication mapped in the first subframe and the third subframe, the second type reference signal being not mapped in the second subframe between the first subframe and the third subframe, and the second type reference signal being mapped such that a number of resources to which the second type reference signal is mapped per resource block is lower than a number of resources to which the first type reference signal is mapped per resource block; and
    transmitting the first type reference signal and the second type reference signal.

11. The communication method according to claim 10, comprising mapping a third type reference signal on a resource block upon which data is mapped.

12. The communication method according to claim 11, wherein the third type reference signal is a UE-specific reference signal.

13. The communication method according to claim 10, wherein the first type reference signal and the second type reference signal are a cell-specific reference signal.

14. The communication method according to claim 10, wherein at least one of the first type reference signal and the second type reference signal is used for computing a CQI.

15. The communication method according to claim 10, wherein the type first reference signal is used for demodulating the PBCH or a downlink control channel.

16. The communication method according to claim 10, wherein the first type reference signal is a reference signal configured for up to 4 antenna ports, and the second type reference signal is a reference signal configured for up to 8 antenna ports.

17. The communication method according to claim 10, wherein the first type of communication supports up to 4 antenna ports for the first type reference signal, and the second type of communication supports up to 8 antenna ports for the second type reference signal.

18. The communication method according to claim 10, wherein the first type of communication is a communication in LTE, and the second type of communication is a communication in LTE-Advanced.

* * * * *